United States Patent
Hiroki

(10) Patent No.: US 9,902,402 B2
(45) Date of Patent: Feb. 27, 2018

(54) VEHICLE STATE ESTIMATION SYSTEM, VEHICLE STATE ESTIMATION METHOD, AND OPERATION SUPPORT SYSTEM

(75) Inventor: Daisuke Hiroki, Toda (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 123 days.

(21) Appl. No.: 14/378,168

(22) PCT Filed: Feb. 24, 2012

(86) PCT No.: PCT/JP2012/054614
§ 371 (c)(1),
(2), (4) Date: Aug. 12, 2014

(87) PCT Pub. No.: WO2013/125035
PCT Pub. Date: Aug. 29, 2013

(65) Prior Publication Data
US 2015/0005983 A1    Jan. 1, 2015

(51) Int. Cl.
*B60W 40/12* (2012.01)
*G06N 5/02* (2006.01)
*G06N 5/00* (2006.01)
*B60W 40/09* (2012.01)
*B60W 50/00* (2006.01)

(52) U.S. Cl.
CPC ............ *B60W 40/12* (2013.01); *B60W 40/09* (2013.01); *G06N 5/00* (2013.01); *G06N 5/02* (2013.01); *B60W 50/0098* (2013.01); *B60W 2050/0045* (2013.01); *B60W 2050/0077* (2013.01)

(58) Field of Classification Search
CPC ................. B60W 40/12; B60W 40/09; B60W 2050/0045; B60W 2050/0077; B60W 50/0098; G06N 5/00; G06N 5/02
See application file for complete search history.

(56) References Cited

U.S. PATENT DOCUMENTS 6,363,348 B1 *   3/2002   Besling ................ G06K 9/6217
                                                      704/251
2010/0268412 A1   10/2010  Mori et al.

FOREIGN PATENT DOCUMENTS

| JP | 2007 237913 | 9/2007 |
| JP | 4306349 | 7/2009 |
| JP | 2010 247799 | 11/2010 |
| JP | 2011 3076 | 1/2011 |

(Continued)

OTHER PUBLICATIONS

Machine Translation of JP 2011-003076, printed Dec. 22, 2015.*

(Continued)

*Primary Examiner* — Kimberly S Berona
*Assistant Examiner* — Alan D Hutchinson
(74) *Attorney, Agent, or Firm* — Oblon, McClelland, Maier & Neustadt, L.L.P.

(57) ABSTRACT

According to the present invention, a state estimation control device installed in a vehicle manages a rule set, which is a set of defined rules that are defined by rough set theory, which uses various vehicle data as conditional attributes and the state of the vehicle as the determining attribute. The state estimation control device acquires vehicle data of the vehicle that is the estimation objective, and estimates the state of the vehicle by referencing the rule set based on the acquired vehicle data.

11 Claims, 20 Drawing Sheets

(56) References Cited

FOREIGN PATENT DOCUMENTS

JP          2011-59802 A      3/2011

OTHER PUBLICATIONS

Rissino, Silvia, and Germano Lambert-Torres. "Rough set theory-fundamental concepts, principals, data extraction, and applications." Data mining and knowledge discovery in real life applications (2009): 438.*

Office Action dated Aug. 4, 2015 in Japanese Patent Application No. 2014-500835.

International Search Report dated May 22, 2012 in PCT/JP12/054614 filed Feb. 24, 2012.

* cited by examiner

Fig.5

| Condition attribute | Period | | | | | | | | | | | |
|---|---|---|---|---|---|---|---|---|---|---|---|---|
| | T0-T1 | T1-T2 | T2-T3 | T3-T4 | T4-T5 | T5-T6 | T6-T7 | T7-T8 | T8-T9 | T9-T10 | T10-T11 | T11-12 |
| f | 0 | 0 | 0 | 0 | 0 | 0 | 0 | 0 | 0 | 0 | 0 | 0 |
| e | 0 | 0 | 0 | 0 | 0 | 0 | 0 | 0 | 0 | 0 | 0 | 0 |
| d | 0 | 0 | 0 | 0 | 0 | 0 | 0 | 0 | 0 | 0 | 0 | 0 |
| c | 1 | 1 | 1 | 1 | 1 | 1 | 1 | 1 | 1 | 1 | 1 | 1 |
| b | 0 | 1 | 1 | 1 | 1 | 1 | 1 | 1 | 1 | 1 | 0 | 0 |
| a | 0 | 1 | 1 | 0 | 0 | 0 | 0 | 0 | 0 | 0 | 0 | 0 |
| g | 1 | 1 | 1 | 1 | 1 | 1 | 1 | 1 | 1 | 1 | 1 | 1 |
| h | 1 | 1 | 1 | 1 | 1 | 1 | 1 | 1 | 1 | 1 | 1 | 1 |
| i | 1 | 0 | 0 | 0 | 0 | 0 | 0 | 0 | 0 | 0 | 0 | 0 |
| j | 0 | 0 | 0 | 0 | 0 | 0 | 0 | 0 | 0 | 0 | 0 | 0 |
| k | 0 | 0 | 0 | 0 | 0 | 0 | 0 | 0 | 0 | 0 | 0 | 0 |
| Headlight — l | 1 | 1 | 1 | 1 | 0 | 0 | 0 | 0 | 0 | 0 | 0 | 0 |
| Navigation — m | 0 | 0 | 0 | 0 | 0 | 0 | 0 | 0 | 1 | 1 | 0 | 0 |
| Positional information — n | 1 | 1 | 1 | 1 | 1 | 1 | 1 | 1 | 1 | 1 | 1 | 1 |
| Date and time — o | 1 | 1 | 1 | 1 | 1 | 1 | 1 | 1 | 1 | 1 | 1 | 1 |

Evaluation item of physical quantity: f, e, d, c, b, a, g, h, i, j, k

| Decision attribute — Vehicle state | | | | | | | | | | | | |
|---|---|---|---|---|---|---|---|---|---|---|---|
| s1 | s2 | s3 | s3 | s4 | s5 | s6 | s7 | s8 | s9 | s10 | s11 |
| State C1 | State C2 | State C3 | State C3 | State C4 | State C5 | State C6 | State C7 | State C8 | State C9 | State C10 | State C11 |

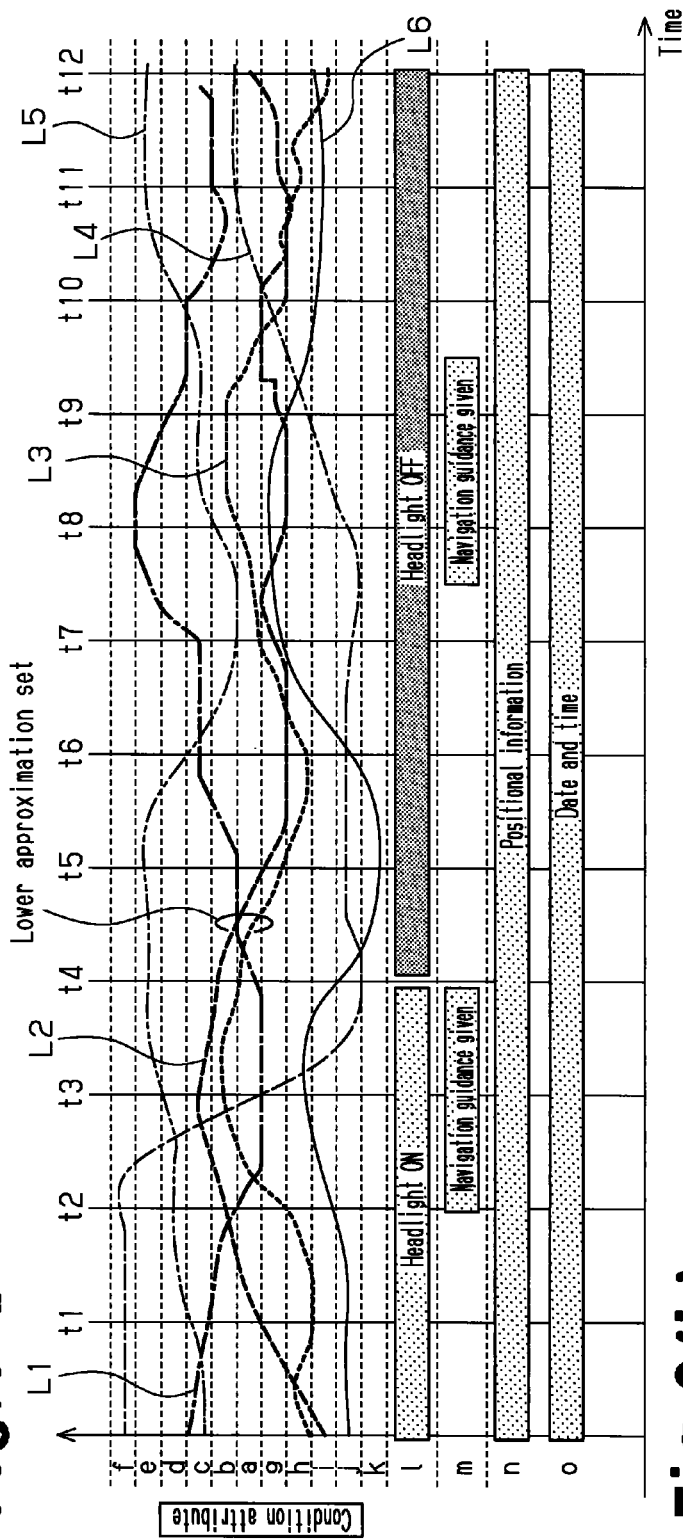

Fig.7

| Definition rule | Pattern | Condition attribute | | Decision attribute | Vehicle state |
|---|---|---|---|---|---|
| | | Lower approximation set | Upper approximation set | | |
| Definition rule 1 | Pattern a1 | c, g, h, i, l | a | s1 | C1 |
| | Pattern a2 | c, g, h, i, l | b | | |
| | Pattern a3 | c, g, h, i, l | d | | |
| | Pattern a4 | c, g, h, i, l | e | | |
| | Pattern a5 | c, g, h, i, l | k | | |
| | Pattern a6 | c, g, h, i, l | m | | |
| | Pattern a7 | c, g, h, i, l | a, b | | |
| | Pattern a8 | c, g, h, i, l | a, b, d, e, k, m | | |
| | Pattern a9 | c, g, h, i, l | a, b, d, e, k, m | | |
| | Pattern a10 | c, g, h, i, l | a, b, d, e, k, m | | |
| | Pattern a11 | c, g, h, i, l | a, b, d, e, k, m | | |
| | Pattern a12 | c, g, h, i, l | a, b, d, e, k, m | | |
| Definition rule n | Pattern b1 | c, g, h, i | a | Sn | Cn |
| | Pattern b2 | c, g, h, i | b | | |
| | Pattern b3 | c, g, h, i | cd | | |
| · | · | · | · | · | · |

Fig.8

| Definition rule | | Condition attribute | | Decision attribute | CI value |
|---|---|---|---|---|---|
| | | Lower approximation set | Upper approximation set | | |
| 1 | C*1 | c, g, h, i, l | a, b, d, e, k, m | s1 | 0.385 |
| 2 | C*2 | a, b, g, h, l | c, d, e, f, i, j, k | s2 | 0.385 |
| 3 | C*3 | a, b, c, g, l, m | d, e, f, h, i, j, k | s3 | 0.462 |
| 4 | C*4 | a, b, g | c, d, e, f, h, i, j, k, l, m | s4 | 0.231 |
| 5 | C*5 | b, c, g, h | a, d, e, f, i, j, k, l, m | s5 | 0.308 |
| 6 | C*6 | c, g, h | a, b, d, e, f, i, j, k, l, m | s6 | 0.231 |
| 7 | C*7 | a, c, d, e, g, m | b, f, h, i, j, k, l | s7 | 0.462 |
| 8 | C*8 | b, d, e, m | a, c, f, g, h, i, j, k, l | s8 | 0.308 |
| 9 | C*9 | a, b, d, g, m | c, e, f, h, i, j, k, l | s9 | 0.385 |
| 10 | C*10 | a, b, c, g, h | a, d, e, f, i, j, k, l, m | s10 | 0.385 |
| 11 | C*11 | c, g, h, i | a, b, d, e, f, j, k, l, m | s11 | 0.308 |
| · | · | · | · | · | · |
| N | C*n | · | · | sn | · |

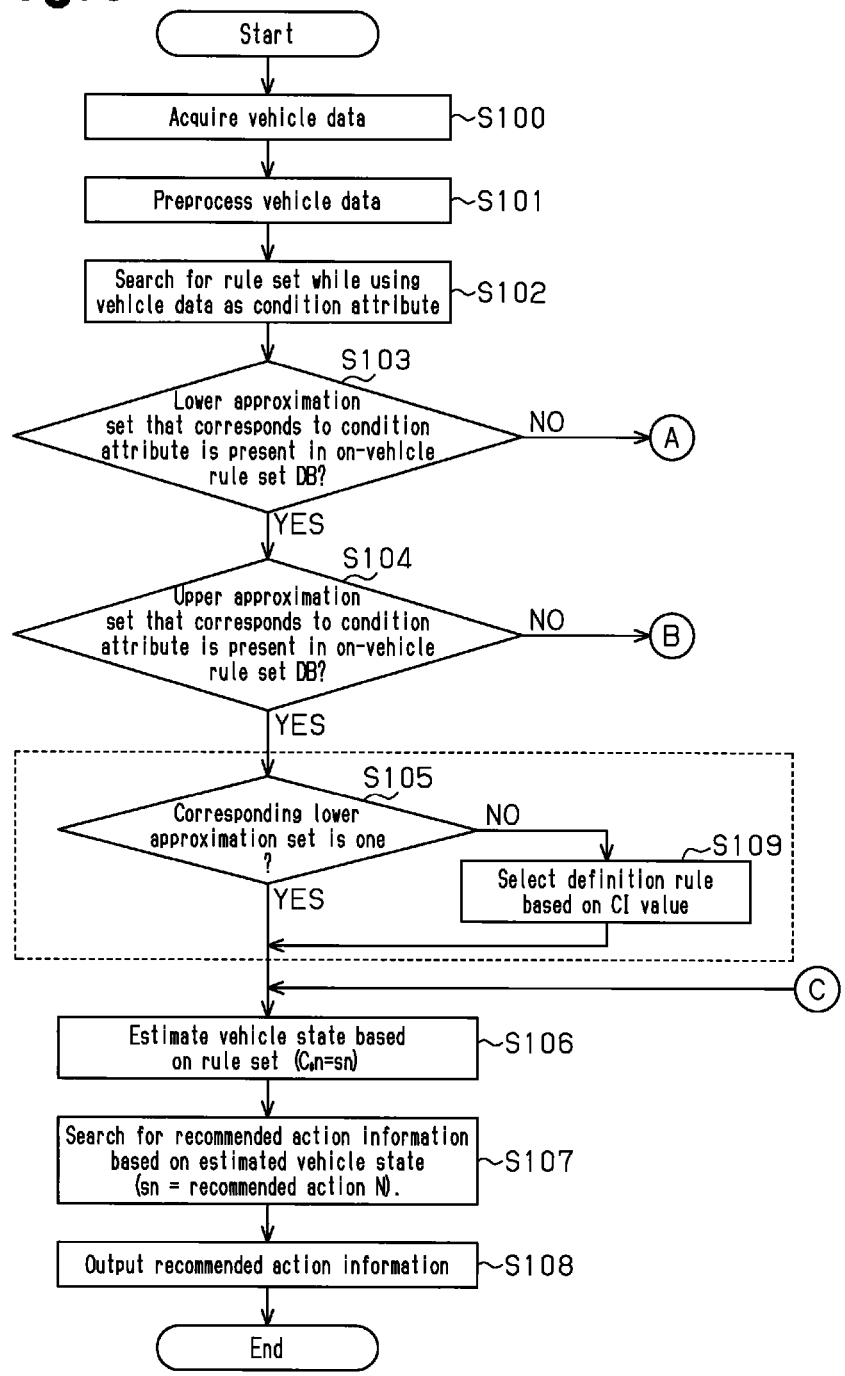

Fig.12(a)

| Data to be estimated |
|---|
| c, g, h, f |

Fig.12(b)

| Definition rule | Condition attribute | | Decision attribute | CI value |
|---|---|---|---|---|
| | Lower approximation set | Upper approximation set | | |
| 1 | C∗1 | c, g, h, l, l | a, b, d, e, k, m | s1 | 0.385 |
| 2 | C∗2 | a, b, g, h, l | c, d, e, f, i, j, k | s2 | 0.385 |
| 3 | C∗3 | a, b, c, g, l, m | d, e, f, h, i, j, k | s3 | 0.462 |
| 4 | C∗4 | a, b, g | c, d, e, f, h, i, j, k, l, m | s4 | 0.231 |
| 5 | C∗5 | b, c, g, h | a, d, e, f, i, j, k, l, m | s5 | 0.308 |
| 6 | C∗6 | c, g, h | a, b, d, e, f, i, j, k, l, m | s6 | 0.231 |
| 7 | C∗7 | a, c, d, e, g, m | b, f, h, i, j, k, l | s7 | 0.462 |
| 8 | C∗8 | b, d, e, m | a, c, f, g, h, i, j, k, l | s8 | 0.308 |
| 9 | C∗9 | a, b, d, g, m | c, e, f, h, i, j, k, l | s9 | 0.385 |
| 10 | C∗10 | a, b, c, g, h | a, d, e, f, i, j, k, l, m | s10 | 0.385 |
| 11 | C∗11 | c, g, h, i | a, b, d, e, f, j, k, l, m | s11 | 0.308 |
| · | · | · | · | · |
| N | C∗n | · | · | sn | · |

Fig.13

Recommended action database

| Vehicle state | Recommended action | Recommended action |
|---|---|---|
| Decision attribute S1 | Spin induction state | Spin control |
| Decision attribute S2 | · | · |
| Decision attribute S3 | · | · |
| Decision attribute S4 | · | · |
| Decision attribute S5 | · | · |
| Decision attribute S6 | Accelerator excessive depression | Reduction of accelerator depression |
| Decision attribute S7 | · | · |
| Decision attribute S8 | Unstable steering | Steering |
| · | · | · |
| · | · | · |
| Decision attribute Sn | Sudden braking state | Reduction of brake pedal depression |

Fig.14(a)

| Data to be estimated |
|---|
| b, c, d, e, g, h, i, l, m |

Fig.14(b)

| Definition rule | Condition attribute | | Decision attribute | CI value |
|---|---|---|---|---|
| | Lower approximation set | Upper approximation set | | |
| 1 | c, g, h, i | a, b, d, e, f, j, k, m | s1 | 0.385 |
| 2 | a, b, g, h, l | c, d, e, f, i, j, k, m | s2 | 0.385 |
| 3 | a, b, c, g, l, m | d, e, f, h, i, j, k | s3 | 0.462 |
| 4 | a, b, g | c, d, e, f, h, i, j, k, l, m | s4 | 0.231 |
| 5 | b, c, g, h | a, d, e, f, i, j, k, l, m | s5 | 0.308 |
| 6 | c, g, h | a, b, d, e, f, i, j, k, l, m | s6 | 0.231 |
| 7 | a, c, d, e, g, m | b, f, h, i, j, k, l | s7 | 0.462 |
| 8 | b, d, e, m | a, c, f, g, h, i, j, k, l | s8 | 0.308 |
| 9 | a, b, d, g, m | c, e, f, h, i, j, k, l | s9 | 0.385 |
| 10 | a, b, c, g, h | a, d, e, f, i, j, k, l, m | s10 | 0.385 |
| 11 | c, g, h, i | a, b, d, e, f, j, k, l | s11 | 0.308 |
| · | · | · | · | · |
| N | C·n | · | sn | · |

Fig.15(a)

| Data to be estimated |
|---|
| a, b, c, m, l |

Fig.15(b)

| Data to be estimated |
|---|
| c, g, h, ×  |

Fig.15(c)

| Definition rule | Condition attribute | | Decision attribute | CI value |
|---|---|---|---|---|
| | Lower approximation set | Upper approximation set | | |
| 1 | C·1 | c, g, h, i, l | a, b, d, e, k, m | s1 | 0.385 |
| 2 | C·2 | a, b, g, h, l | c, d, e, f, i, j, k | s2 | 0.385 |
| 3 | C·3 | a, b, c, g, l, m | d, e, f, h, i, j, k | s3 | 0.462 |
| 4 | C·4 | a, b, g | c, d, e, f, h, i, j, k | s4 | 0.231 |
| 5 | C·5 | b, c, g, h | a, d, e, f, i, j, k, l, m | s5 | 0.308 |
| 6 | C·6 | c, g, h | a, b, d, e, f, i, j, k, l, m | s6 | 0.231 |
| 7 | C·7 | a, c, d, e, g, m | b, f, h, i, j, k, l | s7 | 0.462 |
| 8 | C·8 | b, d, e, m | a, c, f, g, h, i, j, k, l | s8 | 0.308 |
| 9 | C·9 | a, b, d, g, m | c, e, f, h, i, j, k, l | s9 | 0.385 |
| 10 | C·10 | a, b, c, g, h | a, d, e, f, i, j, k, l, m | s10 | 0.385 |
| 11 | C·11 | c, g, h, i | a, b, d, e, f, j, k, l, m | s11 | 0.308 |
| · | · | · | · | · | · |
| N | C·n | | | sn | |

Fig.16(a)

| Data to be estimated |
|---|
| a, b, m, c |

Fig.16(b)

| Data to be estimated |
|---|
| a, b, m, x |

Fig.16(c)

| Definition rule | Condition attribute | | | Decision attribute |
|---|---|---|---|---|
| | Lower approximation set | | Upper approximation set | |
| 1 | C.1 | c, g, h, i, l | a, b, d, e, k, m,...x | s1 |
| 2 | C.2 | a, b, g, h, l | c, d, e, f, i, j, k,..y | s2 |
| 3 | C.3 | a, b, c, g, l, m | d, e, f, h, i, j, k,..y, z | s3 |
| 4 | C.4 | a, b, g | c, d, e, f, h, i, j, k, l, m,...x, y, z | s4 |
| 5 | C.5 | b, c, g, h | a, d, e, f, i, j, k, l, m,...x, y, z | s5 |
| 6 | C.6 | c, g, h | a, b, d, e, f, i, j, k, l, m,...x, y, z | s6 |
| 7 | C.7 | a, c, d, e, g, m | b, f, h, i, j, k, l,...x, y, z | s7 |
| 8 | C.8 | b, d, e, m | a, c, f, g, h, i, j, k, l,...x, y, z | s8 |
| 9 | C.9 | a, b, d, g, m | a, c, e, f, h, i, j, k, l, m,...x, y, z | s9 |
| 10 | C.10 | a, b, c, g, h | a, d, e, f, i, j, k, l, m,...x, y, z | s10 |
| 11 | C.11 | c, g, h, i | a, b, d, e, f, i, j, k, l, m,...x, y | s11 |
| 12 | C.12 | a, b, m, l | c, d, e, f, g, h, i, j, k, z | s12 |
| 13 | C.13 | . | . | s13 |
| 14 | C.14 | . | . | s14 |
| N | C.n | | | sn |

| Traveling environment | Vehicle type | Time of day |
|---|---|---|

Fig.17(a)

| Data to be estimated |
|---|
| a, b, m, ... c |

Fig.17(b)

| Data to be estimated |
|---|
| a, b, m, ... x |

Fig.17(c)

| Definition rule | Condition attribute | | Decision attribute |
|---|---|---|---|
| | Lower approximation set | Upper approximation set | |
| 1 | c, g, h, i, l | a, b, d, e, k, m,...x | s1 |
| 2 | a, b, g, h, l | c, d, e, f, i, j, k,..y | s2 |
| 3 | a, b, c, g, l, m | d, e, f, h, i, j, k,..y, z | s3 |
| 4 | a, b, g | c, d, e, f, h, i, j, k, l, m,..x, y, z | s4 |
| 5 | b, c, g, h | a, d, e, f, i, j, k, l, m,..x, y, z | s5 |
| 6 | c, g, h | a, b, d, e, f, i, j, k, l, m,..x, y, z | s6 |
| 7 | a, c, d, e, g, m | b, f, h, i, j, k, l,..x, y, z | s7 |
| 8 | b, d, e, m | a, c, f, h, i, j, k, l,..x, y, z | s8 |
| 9 | a, b, d, g, m | c, e, f, h, i, j, k, l, m,..x, y, z | s9 |
| 10 | a, b, c, g, h | a, d, e, f, i, j, k, l, m,..x, y, z | s10 |
| 11 | c, g, h, i | a, b, d, e, f, j, k, l, m,..x, y | s11 |
| 12 | a, b, m, l | c, d, e, f, g, h, i, j, k, z | x |
| 13 | · | · | s13 |
| 14 | · | · | s14 |
| N | · | · | sn |

| Traveling environment | Vehicle type | Time of day |
|---|---|---|

Fig.18(a)

| Data to be estimated |
|---|
| c, g, h, x |

Fig.18(b)

| Data to be estimated |
|---|
| c, g, h, z |

Fig.18(c)

| Definition rule | Condition attribute | | | Decision attribute | CI value |
|---|---|---|---|---|---|
| | Lower approximation set | Upper approximation set | | | |
| 1 | c, g, h, i, l | a, b, d, e, k, m | | s1 | 0.385 |
| 2 | a, b, g, h, l | c, d, e, f, i, j, k | | s2 | 0.385 |
| 3 | a, b, c, g, l, m | d, e, f, h, i, j, k | | s3 | 0.462 |
| 4 | a, b, g | c, d, e, f, h, i, j, k, l, m | | s4 | 0.231 |
| 5 | b, c, g, h | a, d, e, f, i, j, k, l, m | | s5 | 0.308 |
| 6 | c, g, h | a, b, d, e, f, i, j, k, l, m | | s6 | 0.231 |
| 7 | a, c, d, e, g, m | b, f, h, i, j, k, l | | s7 | 0.462 |
| 8 | b, d, e, m | a, c, f, g, h, i, j, k, l | | s8 | 0.308 |
| 9 | a, b, d, g, m | c, e, f, h, i, j, k, l | | s9 | 0.385 |
| 10 | a, b, c, g, h | a, d, e, f, i, j, k, l, m | | s10 | 0.385 |
| 11 | c, g, h | a, b, d, e, f, i, j, k, l, m | | s11 | 0.308 |
| · | · | · | | · | · |
| N | C,n | | | sn | |

Fig.19(a)

Data to be estimated
| c, g, h | x |

Fig.19(b)

Data to be estimated
| c, g, h | z |

Fig.19(c)

| Definition rule | Condition attribute | | Decision attribute |
|---|---|---|---|
| | Lower approximation set | Upper approximation set | |
| 1 | C·1   c, g, h, i, l | a, b, d, e, k, m,...x | s1 |
| 2 | C·2   a, b, g, h, l | c, d, e, f, i, j, k,...y | s2 |
| 3 | C·3   a, b, c, g, l, m | d, e, f, h, i, j, k,...y, z | s3 |
| 4 | C·4   a, b, g | c, d, e, f, h, i, j, k, l, m...x, y, z | s4 |
| 5 | C·5   b, c, g, h | a, d, e, f, h, i, j, k, l, m...x, y, z | s5 |
| 6 | C·6   c, g, h | a, b, d, e, f, i, j, k, l, m...(x,) y, z | s6 |
| 7 | C·7   a, c, d, e, g, m | b, f, h, i, j, k, l,...x, y, z | s7 |
| 8 | C·8   b, d, e, m | a, c, f, g, h, i, j, k, l,...x, y, z | s8 |
| 9 | C·9   a, b, d, g, m | c, e, f, h, i, j, k, l,...x, y, z | s9 |
| 10 | C·10  a, b, c, g, h | d, e, f, i, j, k, l, m,...x, y, z | s10 |
| 11 | C·11  c, g, h, i | a, b, d, e, f, j, k, l, m,...x, y | s11 |
| 12 | C·12  a, b, m, l | c, d, e, f, g, h, i, j, k, z | s12 |
| 13 | C·13  · | · | s13 |
| 14 | C·14  · | · | s14 |
| N | C·n   · | · | sn |

Traveling environment | Vehicle type | Time of day

VEHICLE STATE ESTIMATION SYSTEM, VEHICLE STATE ESTIMATION METHOD, AND OPERATION SUPPORT SYSTEM

FIELD OF THE DISCLOSURE

The present invention relates to a vehicle state estimation system, a vehicle state estimation method, and a driving support system using the vehicle state estimation that are advantageous for application to estimation of a state of a vehicle such as an automobile.

BACKGROUND OF THE DISCLOSURE

In recent years, a driving support system has been developed, for example, to control various pieces of vehicle equipment mounted in a vehicle, such as an automobile, in accordance with a vehicle state or a traveling environment of the vehicle. This driving support system identifies the vehicle state or traveling environment in response to signals and the like acquired by various sensors mounted in the vehicle. Based on this distinction result, the driving support system performs control and the like of the vehicle equipment.

For example, in the driving support system disclosed by Patent Document 1, information showing a vehicle state is acquired from a key switch, a shift lever, a vehicle speed sensor, an air bag, an antitheft device, and the like that are mounted in a vehicle. The driving support system has a vehicle situation definition table in which information contents concerning the key switch, the shift lever, the vehicle speed sensor, the air bag, the antitheft device, and the like and pre-defined vehicle situations (vehicle states) are correlated with each other. In this vehicle situation definition table, situations, such as "during parking", "during stopping", "traveling (moving forward)", "moving backward", "when collided", and "when stolen", are defined as the vehicle situations. An operation system including the thus formed vehicle situation definition table concludes that the vehicle situation is "during parking" with reference to the vehicle situation definition table, for example, when the key switch indicates "Off", when the shift lever indicates "P", and when the vehicle speed indicates "0 km per hour". Based on the concluded vehicle situation, the driving support system determines the priority of actions of various pieces of vehicle equipment mounted in the vehicle. For example, when the concluded vehicle situation is "during parking", the driving support system determines that the priority of vehicle equipment other than a keyless entry having high action priority is low when parked, and the driving support system performs control to reduce the amount of electric power supply to vehicle equipment other than the keyless entry. As a result, the amount of electric power supply to vehicle equipment is controlled in accordance with vehicle situations in each case, and the amount of electric power consumption in the vehicle is reduced.
Patent Document 1: Japanese Laid-Open Patent Publication No. 2007-237913

SUMMARY OF THE DISCLOSURE

Problems that the Invention is to Solve

The vehicle state gradually changes in accordance with a vehicle operation performed by the driver or in accordance with the traveling environment. Recently, in order to realize more advanced driving support, the vehicle state has been required to be defined in more detail not only as "during traveling" or "during stopping" but also as a stable traveling state that has fewer vehicle behaviors or as an unstable traveling state that has more vehicle behaviors concerning a traveling-vehicle state.

On the other hand, if the vehicle state is defined in detail, the amount of information necessary to define the vehicle state will also inevitably increase. Therefore, the amount of information to be processed to determine the vehicle state will be huge in addition to the fact that the amount of information to be recorded in the vehicle situation definition table becomes greater. As a result, it will be impossible to disregard an increase in the processing load of a controller and the like that processes these pieces of information or an increase in the communication data amount resulting from transmission and reception of these pieces of information.

Accordingly, it is an objective of the present invention to provide a vehicle state estimation system, a vehicle state estimation method, and a driving support system using the vehicle state estimation that are capable of defining a vehicle state in detail while reducing the processing load of vehicle data necessary to estimate the vehicle state.

Means for achieving the above objective and advantages thereof will now be discussed.

To achieve the foregoing objective, the present invention provides a vehicle state estimation system that estimates a state of a vehicle based on a plurality of portions of vehicle data. The vehicle state estimation system includes a management section and a state estimation section. The management section manages a rule set that is a set of definition rules defined by rough set theory, in which the portions of vehicle data are condition attributes and the state of the vehicle is a decision attribute. The state estimation section acquires vehicle data of the vehicle, which is a target of estimation, and estimates a vehicle state of the vehicle through reference to the rule set based on the acquired vehicle data.

To achieve the foregoing objective, the present invention also provides a vehicle state estimation method for estimating a vehicle state by computer aid based on a plurality of portions of vehicle data. The vehicle state estimation method includes: a management step for managing a rule set that is a set of definition rules defined by rough set theory in which the portions of vehicle data are used as condition attributes and the vehicle state is used as a decision attribute; and an estimating step for acquiring vehicle data of a vehicle that is a target of estimation and then estimating a vehicle state through reference to the rule set based on acquired vehicle data.

For example, various vehicle states are reflected in vehicle data flowing through a vehicle network, and it is possible to estimate a vehicle state by analyzing the vehicle data. However, an uncountable number of portions of vehicle data are present in the vehicle network, and an uncountable number of patterns of vehicle data corresponding to a specific vehicle state are present. Therefore, if a specific rule is defined based on vehicle data, vehicle data showing this defined rule will be huge. If a vehicle state is estimated based on this specific rule and based on vehicle data flowing through the vehicle network, the amount of vehicle data necessary to estimate it will be huge, and the amount of processing and the amount of communication of these portions of vehicle data will be huge.

In this respect, according to the aforementioned configuration or method, a rule set, which is a set of definition rules showing a correlation between an uncountable number of portions of vehicle data and a specific vehicle state, is defined by rough set theory. Therefore, it is possible to select specific vehicle data common to the specific vehicle state among an uncountable number of portions of vehicle data simply by analyzing vehicle data and a vehicle state when this vehicle data is acquired based on rough set theory. On the condition that this specific vehicle data is used as a condition attribute and that a definition rule using a corresponding specific vehicle state as a decision attribute is defined, if at least this vehicle data shown by the definition rule is acquired from a vehicle that is a target of vehicle state estimation, it will be possible to estimate the vehicle state. As a result, it is possible to define various vehicle states that have a correlation with an uncountable number of portions of vehicle data by means of specific vehicle data, and it is possible to estimate a vehicle state based on the defined definition rule and based on minimum necessary vehicle data. Therefore, the amount of data of definition rules to define vehicle states is significantly reduced, and the load necessary to estimate a vehicle state using the definition rule is significantly reduced. Therefore, it is possible to estimate a gradually changing vehicle state with a higher real-time capability.

In accordance with one aspect of the present invention, when undefined vehicle data other than condition attributes about specific decision attributes defined by the definition rules is included in vehicle data of the vehicle that is a target of estimation, the management section performs contraction processing that is processing to contract condition attributes corresponding to the specific decision attributes to a subset, and uses data in which undefined vehicle data has been added to the contracted condition attributes as a data management unit.

In accordance with another aspect of the present invention, the management step further includes a contraction step for, when undefined vehicle data other than a condition attribute about a specific decision attribute defined in the definition rule is included in vehicle data of a vehicle that is a target of estimation, contracting the condition attribute that corresponds to the specific decision attribute to a subset and then using data in which undefined vehicle data has been added to a contracted condition attribute as a data management section.

Vehicle data is innumerably present, and even if the vehicle state is the same, there will be a case in which contents of partial vehicle data change or in which partial vehicle data is newly included. The vehicle data that has changed at this time or the vehicle data newly included is vehicle data included as data having a possibility when the vehicle shifts to a specific state. On the other hand, when the vehicle shifts to a specific state, vehicle data that is necessarily included is also present. Therefore, the definition rule is shown by a lower approximation set made up of condition attributes included in common when the vehicle state is a specific state and by an upper approximation set made up of condition attributes capable of being included as a possibility when the vehicle state is a specific state. Therefore, in order to estimate a vehicle state based on this definition rule and the vehicle data acquired from the vehicle, an upper approximation set and a lower approximation set of a certain definition rule are required to be included in vehicle data of a vehicle that is a target of estimation. Therefore, even if the condition attributes that form the lower approximation set of a certain definition rule are included in the vehicle data of the vehicle that is a target of estimation, when the condition attributes that form the upper approximation set of the definition rule are not included in the vehicle data, it is difficult to estimate the vehicle state based on this acquired vehicle data. It is also considered that a definition rule to define a vehicle state from the vehicle data a part of which is unknown vehicle data is newly defined by using all of the vehicle data. However, if a definition rule is newly defined by using all of the vehicle data a part of which is unknown vehicle data, there will be a fear that the amount of data of the definition rule will increase, the processing load of the vehicle data will increase, and the communication load to transmit and receive the vehicle data will increase when the vehicle data is processed.

In this respect, according to the aforementioned configuration or method, when a condition attribute included in an upper approximation set of a definition rule is not present although a condition attribute included in a lower approximation set defined in the definition rule is present in vehicle data acquired from a vehicle that is a target of estimation, the condition attribute of the lower approximation set is contracted. Additionally, data in which a condition attribute showing vehicle data undefined in the upper approximation set is added to the contracted lower approximation set is defined as a data management section. A definition rule that corresponds to the pattern of a new condition attribute is defined based on the management section, or data showing vehicle data is transmitted and received based on the management section. As a result, the amount of data to prescribe a definition rule is reduced, and the amount of communication is reduced when a definition rule is defined or when a vehicle state is estimated.

In particular, the present invention is effective by being applied when sample data, such as vehicle data, that is used as a condition attribute is fluid. In other words, various factors are reflected in the vehicle data, and therefore, even if the vehicle is in a common state and even if the lower approximation set is common, the upper approximation set of the vehicle data may fluidly change. In this respect, according to the aforementioned configuration or method, even if sample data used as a condition attribute is fluid vehicle data, the definition of a vehicle state (a decision attribute) or the estimation of a vehicle state is realized while using the minimum amount of data.

In accordance with one aspect of the present invention, the vehicle state estimation system is configured to estimates a vehicle state through cooperation between a vehicular information terminal that includes the management section and the state estimation section and is used in the vehicle and an external terminal that has a rule set group defined based on vehicle data acquired based on a plurality of kinds of vehicle operations. The vehicular information terminal makes an inquiry based on vehicle data of the vehicle that is a target of estimation to the external terminal when a definition rule capable of estimating a vehicle state is not present or when a plurality of definition rules capable of estimating a vehicle state are present. The external terminal selects a definition rule corresponding to the vehicle data of the inquiry from the rule set group possessed by the external terminal, and delivers the selected definition rule to the vehicular information terminal.

In accordance with another aspect of the present invention, the vehicle state estimation method further includes a requesting step for causing the vehicular information terminal used in the vehicle to perform the management step and the estimation step and estimating at the estimation step a vehicle state by cooperation between an external terminal that has a rule set group defined based on vehicle data acquired based on a plurality of kinds of vehicle operations and the vehicular information terminal. When a definition rule capable of estimating a vehicle state is not present in the vehicular information terminal or when a plurality of definition rules capable of estimating a vehicle state is present in the vehicular information terminal, the vehicular information terminal is caused to make an inquiry based on vehicle data of a vehicle that is a target of estimation to the external terminal. The method also includes a delivering step for selecting a rule set corresponding to the vehicle data of the inquiry from the rule set group possessed by the external terminal and then delivering a selected rule set from the external terminal to the vehicular information terminal.

In rough set theory, it is possible to define more definition rules in proportion to an increase in the number of portions of vehicle data used as sample data. Moreover, it is possible to estimate a vehicle state in detail or variously.

In this respect, according to the aforementioned configuration or method, vehicle data obtained based on a plurality of kinds of vehicle operations, i.e., vehicle data obtained under the vehicle operations of a plurality of drivers even if it is the same vehicle, or vehicle data obtained from different vehicles is collected into an external terminal. A definition rule is defined based on the thus obtained vehicle data. As a result, it is possible for the external terminal to have a definition rule that can define a vehicle state in more detail or to have a definition rule that can variously estimate a vehicle state. Therefore, it also is possible for the external terminal to have a definition rule that is not possessed by the vehicular information terminal, and it is possible to estimate a vehicle state even if it is a state that cannot be estimated by the vehicular information terminal. Therefore, it is possible for the vehicular information terminal to estimate a vehicle state based on a definition rule delivered from the external terminal, and it is possible to estimate a vehicle state through cooperation with the external terminal even if the vehicle state cannot be estimated by a definition rule possessed by the vehicular information terminal. As a result, it is possible to estimate a vehicle state in more detail and variously.

Since various condition attributes are included in vehicle data, and therefore, there is a possibility that a plurality of definition rules capable of estimating a vehicle state based on the condition attributes are present in the vehicular information terminal. In this respect, according to the aforementioned configuration or method, it is possible to also allow the external terminal to have abundant definition rules defined based on abundant condition attributes. Therefore, it is possible to narrow a definition rule used for a vehicle state in the external terminal even if it is difficult to narrow a definition rule used for a vehicle state in the vehicular information terminal. As a result, it is possible to estimate a vehicle state with higher accuracy.

According to the aforementioned configuration or method, it is also possible to bring definition rules possessed by the vehicular information terminal into a minimum necessary status while estimating the vehicle state in detail or variously through cooperation between the vehicular information terminal and the external terminal.

In accordance with one aspect of the present invention, when a condition attribute corresponding to vehicle data of the vehicle that is a target of estimation is not present in the rule set managed by the management section of the vehicular information terminal, the vehicular information terminal performs, as the inquiry, processing to transmit the vehicle data to the external terminal. The external terminal selects, from the rule set possessed by the external terminal, a definition rule in which the vehicle data received from the vehicular information terminal is defined as a condition attribute, and performs processing to deliver the selected definition rule to the vehicular information terminal.

When a condition attribute corresponding to vehicle data of a vehicle that is a target of estimation is not present in a rule set managed by the management section of the vehicular information terminal, the condition attribute is an unknown one for the vehicular information terminal. Therefore, according to the aforementioned configuration or method, the vehicular information terminal transmits vehicle data showing an unknown condition attribute from the vehicular information terminal to the external terminal. When a definition rule including this vehicle data as a condition attribute is present in the external terminal, this definition rule is delivered from the external terminal to the vehicular information terminal. As a result, even if it is an unknown condition attribute for the vehicular information terminal, it is possible to cause the vehicular information terminal to have a definition rule capable of estimating a vehicle state based on this condition attribute later.

In accordance with one aspect of the present invention, when vehicle data of a vehicle that is a target of estimation includes both a lower approximation set that is a basic set showing a reliability of a specific decision attribute and condition attributes not defined in an upper approximation set that are a basic set of possible condition attributes corresponding to the lower approximation set in a definition rule including the lower approximation set, the vehicular information terminal delivers a lower approximation set about the definition rule and condition attributes undefined in the upper approximation set to the external terminal.

When a condition attribute included in a lower approximation set showing a reliability of a decision attribute shown by a definition rule among definition rules possessed by the vehicular information terminal is included in vehicle data, and yet when a condition attribute included in an upper approximation set among the definition rules is not included in the vehicle data, it is difficult to identify that this vehicle data is data corresponding to the definition rule. In other words, at this time, vehicle data undefined in the upper approximation set among the definition rules possessed by the vehicular information terminal is included in the vehicle data, and it is difficult for the vehicular information terminal to estimate the vehicle state based on this vehicle data.

In this respect, according to the aforementioned configuration, an unknown upper approximation set for the vehicular information terminal and a lower approximation set that corresponds to the upper approximation set are transmitted from the vehicular information terminal to the external terminal. At this time, data transmitted from the vehicular information terminal to the external terminal is not the entire vehicle data showing all condition attributes included in the lower approximation set, but is data about a lower approximation set capable of showing all the vehicle data and undefined data about an upper approximation set. In other words, it is possible to show a plurality of condition attributes a to h by means of variable $C^*1$ even when the condition attribute included in variable $C^*1$ as a lower approximation set is present, for example, as a plurality of condition attributes a to h. Therefore, the vehicular information terminal is not required to transmit all the data included in the lower approximation set to the external terminal, but is merely required to transmit one piece of data capable of showing the lower approximation set and undefined data about an upper approximation set among the portions of vehicle data to the external terminal. As a result, the amount of data transmitted by the vehicular information terminal to the external terminal is significantly reduced.

In accordance with one aspect of the present invention, when a definition rule that includes condition attributes included by a lower approximation set received from the vehicular information terminal and the undefined condition attributes is present in a rule set possessed by the external terminal, the external terminal performs processing to transmit the definition rule to the external terminal. When a definition rule that includes condition attributes included by a lower approximation set received from the vehicular information terminal and the undefined condition attributes is not present in a rule set possessed by the external terminal, the external terminal performs processing to newly define a rule in which the undefined condition attributes are added to an upper approximation set that is a subset included as being possible in the definition rule possessed by the external terminal.

According to the aforementioned configuration, when the external terminal has a definition rule capable of estimating a vehicle state not possessed by the vehicular information terminal, the external terminal that has received an inquiry from the vehicular information terminal delivers this definition rule to the vehicular information terminal. Therefore, it is possible for the vehicular information terminal to estimate a vehicle state based on the definition rule delivered from the external terminal.

According to the aforementioned configuration, when a definition rule capable of including an undefined condition attribute in the vehicular information terminal is not present even in the external terminal, the external terminal adds the undefined condition attribute transmitted from the vehicular information terminal to the upper approximation set of the definition rule including the lower approximation set transmitted from the vehicle data. Therefore, subsequently, it is possible for the external terminal to estimate a vehicle state based on vehicle data including the condition attribute that was an undefined condition attribute. As a result, a definition rule capable of defining a vehicle state is extended.

In accordance with one aspect of the present invention, when vehicle data of a vehicle that is a target of estimation includes both a lower approximation set that is a basic set showing a reliability of a specific decision attribute and condition attributes undefined in a definition rule including the lower approximation set, and when a plurality of definition rules each of which includes the lower approximation set are present in a rule set managed by the management section of the vehicular information terminal, the vehicular information terminal delivers a plurality of lower approximation sets about the definition rules and the undefined condition attributes to the external terminal.

When a condition attribute included in a lower approximation set showing a reliability of a decision attribute shown by a definition rule among definition rules possessed by the vehicular information terminal is included in vehicle data, but a condition attribute included in an upper approximation set among the definition rules is not included in the vehicle data, it is difficult to identify that this vehicle data is data corresponding to the definition rule. In other words, at this time, vehicle data undefined in the upper approximation set among the definition rules possessed by the vehicular information terminal is included in the vehicle data, and it is difficult for the vehicular information terminal to estimate the vehicle state based on this vehicle data. When a plurality of definition rules each of which has a lower approximation set capable of including a part of the vehicle data are present, it is difficult for the vehicular information terminal to determine which definition rule is to be used in order to estimate the vehicle state.

In this respect, according to the aforementioned configuration, an unknown upper approximation set for the vehicular information terminal and a plurality of lower approximation sets that correspond to the upper approximation set are transmitted from the vehicular information terminal to the external terminal. At this time, data transmitted from the vehicular information terminal to the external terminal is not the entire vehicle data showing all condition attributes included in the lower approximation sets, but is data about the lower approximation sets capable of showing all the vehicle data and undefined data about an upper approximation set. Therefore, the vehicular information terminal is not required to transmit all the data included in the lower approximation sets to the external terminal, but is merely required to transmit one piece of data capable of showing the lower approximation sets and undefined data about upper approximation sets among the portions of vehicle data to the external terminal. As a result, the amount of data transmitted from the vehicular information terminal to the external terminal is significantly reduced.

In accordance with one aspect of the present invention, when a single definition rule that includes condition attributes included by any one of a plurality of lower approximation sets received from the vehicular information terminal and the undefined condition attributes is present in a rule set possessed by the external terminal, the external terminal performs processing to deliver the single definition rule to the vehicular information terminal. When a single definition rule that includes condition attributes included by any one of a plurality of lower approximation sets received from the vehicular information terminal and the undefined condition attributes is not present in a rule set possessed by the external terminal, the external terminal performs processing to newly define a rule in which the undefined condition attributes are added to an upper approximation set that is a subset included as being possible in the definition rule possessed by the external terminal.

According to the aforementioned configuration, the external terminal that has received an inquiry from the vehicular information terminal identifies a definition rule that has an upper approximation set including an undefined condition attribute in the vehicular information terminal among definition rules that have a plurality of lower approximation sets transmitted from the vehicular information terminal from the rule set groups possessed by the external terminal. The external terminal delivers this identified definition rule to the vehicular information terminal. Therefore, it is possible for the vehicular information terminal to estimate a vehicle state based on the definition rule delivered from the external terminal.

According to the aforementioned configuration, when a definition rule capable of including an undefined condition attribute is not present in the external terminal, the external terminal adds the undefined condition attribute transmitted from the vehicular information terminal to each upper approximation set of each definition rule including a plurality of lower approximation sets transmitted from the vehicular information terminal. Therefore, subsequently, it is possible for the external terminal to estimate a vehicle state based on vehicle data including the condition attribute that was an undefined condition attribute, and a definition rule capable of defining a vehicle state is extended.

In accordance with one aspect of the present invention, the external terminal manages a rule set possessed by the external terminal independently of at least one factor among a type of a vehicle that serves as a source of vehicle data acquisition, a time of day when vehicle data is acquired, and a traveling environment. When an inquiry is received from the vehicular information terminal, the external terminal identifies at least one factor among the type of the vehicle in which the vehicular information terminal is used, the time of day when vehicle data is acquired, and the traveling environment prior to selection of the rule set, and selects a rule set to be delivered to the vehicular information terminal from common or similar rule sets concerning the identified factor.

Data formats or characteristics of vehicle data tend to differ in vehicle type from each other. Therefore, portions of vehicle data acquired from vehicles that are common as or similar to each other in vehicle type approximate each other, and the vehicle-state estimation accuracy based on a definition rule defined based on this vehicle data is also improved.

Likewise, when time of day during which vehicle data is acquired is the same, a road situation and the like, peculiar to the time of day tend to be reflected in a vehicle state. Likewise, vehicle states tend to be closer to each other in proportion to the number of elements in common in a traveling environment of a vehicle when vehicle data is acquired, such as width of street or number of traffic lanes, open road and expressway, inclination, road alignment, presence or absence of congestion, and traveling area. Therefore, a vehicle state is estimated by using vehicle data of a vehicle that is a target of estimation and a definition rule acquired under a situation that is the same or similar in the acquisition time of day or in the traveling environment, and accordingly, it is possible to estimate a vehicle state by using a definition rule suitable for the aspect of a vehicle that is a target of estimation. As a result, the estimation accuracy of a vehicle state is improved.

As described above, according to the aforementioned configuration, the vehicle-state estimation accuracy based on a definition rule is improved by using vehicle data defined based on the vehicle data that is the same as or similar to the vehicle data of a vehicle that is a target of estimation in elements, such as vehicle type, time of day during which vehicle data is acquired, and traveling environment, while using the definition rule that is defined based on a large indefinite number of portions of vehicle data defined based on a plurality of kinds of vehicle operations.

In accordance with one aspect of the present invention, a plurality of pieces of time-series data showing changes in a physical quantity of the vehicle are included in the vehicle data. The state estimation section prescribes an evaluation item that discretely evaluates the physical quantity of the time-series data as a condition attribute, and uses a combination of evaluation items to which a plurality of pieces of time-series data for a specific period belong as a condition attribute concerning a vehicle that is a target of estimation.

A plurality of pieces of time-series data, such as traveling speed or acceleration of the vehicle, steering angle of steering, and detection results of various sensors, that show the changes in the physical quantity of the vehicle run in a vehicle network flowing through a vehicle. The physical quantity of these pieces of time-series data has a strong correlation with the vehicle state. When the vehicle is in a specific vehicle state, there are many cases in which a combination of discrete physical quantities of a plurality of pieces of time-series data is established. Therefore, based on a combination pattern of the discrete physical quantities of a plurality of pieces of time-series data, it is possible to estimate a specific vehicle state.

Therefore, as in the aforementioned configuration, an evaluation item that discretely evaluates the physical quantity shown by the time-series data is prescribed as a condition attribute that forms a definition rule. It is possible to define a definition rule based on the physical quantity of a plurality of pieces of time-series data that has a causal relationship with a vehicle state by using a combination of evaluation items to which the time-series data belongs as a condition attribute about a vehicle that is a target of estimation. As a result, it is possible to define a definition rule by combining physical quantities of the time-series data that occupies a large majority as vehicle data and to estimate a vehicle state through acquisition of this time-series data.

In accordance with one aspect of the present invention, the state estimation section performs at least one of: a. processing to collect the vehicle data each time a predetermined data collection period elapses and to estimate a vehicle state based on collected vehicle data, and b. processing to successively calculate a difference of a plurality of portions of vehicle data for consecutive specific periods and to estimate a vehicle state on the condition that a calculated difference value exceeds or falls to or below a predetermined difference threshold value.

According to the aforementioned configuration, a vehicle state is periodically estimated through the processing a of the condition attribute based on vehicle data periodically collected. Therefore, it is possible to periodically collect gradually-changing vehicle data, and it is possible to periodically estimate a gradually changing vehicle state based on the collected vehicle data.

A difference occurs in vehicle data during consecutive specific periods, for example, when the contents of vehicle data change, or when a new vehicle data is transmitted into the vehicle network, or when specific vehicle data transmitted into the vehicle network is stopped. When the vehicle data changes in this way, there is a high possibility that the vehicle state correlating with the vehicle data will also change. Therefore, according to the aforementioned configuration, the vehicle state is estimated through the processing b of the condition attribute on the condition that a difference of vehicle data in consecutive specific periods exceeds a difference threshold value. Therefore, only when a change occurs in the vehicle data, i.e., only when the possibility that a change will occur in the vehicle state shown by the vehicle data is high, the vehicle state is estimated. As a result, it is possible to estimate the vehicle state only when the vehicle state is predicted to change.

When the difference of the vehicle data falls to or below the difference threshold value, i.e., when the vehicle state that has gradually changed shifts to a specific state, the kind or the contents of vehicle data transmitted into the vehicle network tend to be stabilized. In other words, when the kind or the contents of vehicle data transmitted into the vehicle are stabilized, it is possible to estimate that the vehicle state has been stabilized in a constant state. Therefore, according to the aforementioned configuration, the vehicle state is estimated through the processing b of the condition attribute on the condition that a difference of vehicle data falls to or below a difference threshold value. As a result, it is possible to reduce the estimation frequency of a vehicle state changing gradually, and a calculation load resulting from vehicle state estimation is reduced.

To achieve the foregoing objective, the present invention provides a driving support system that supports operation of a vehicle driver in accordance with a vehicle state estimated based on a plurality of portions of vehicle data. The driving support system includes a recommended action database and a driving support section. Recommended action information to be recommended in accordance with a vehicle state is recorded in the recommended action database. The driving support section that extracts recommended action information that corresponds to a vehicle state estimated by the above described vehicle state estimation system from the recommended action database, and the driving support section performs driving support based on the extracted recommended action information.

There is also a situation in which it is preferable to change a vehicle state to another state, depending on the vehicle state. In other words, for example, when the amount of depression of an accelerator pedal is excessive or when the acceleration or the traveling speed of a vehicle unnecessarily increases, it is preferable to urge the driver to reduce the amount of depression of the accelerator pedal and to stabilize the acceleration and the traveling speed of the vehicle. For example, when vehicle vibrations occur because the steering angle is unstable, it is preferable to control the operational amount of steering so as to fall within a constant range and to reduce the amount generated of the vehicle vibrations. Many vehicle states to be recommended as above are present in various aspects, and it is necessary to estimate the state of a vehicle to be supported as premises for guidance of those vehicle states to be recommended. In this support, a high real-time capability is requested in order to estimate the vehicle state because the vehicle state gradually changes.

In this respect, according to the aforementioned configuration, the state of a vehicle to be supported is first estimated by the aforementioned vehicle state estimation system in order to perform driving support. The driving support section extracts recommended action information that corresponds to the estimated vehicle state from the recommended action database, and performs driving support based on the extracted recommended action information. As a result, it is possible to estimate the vehicle state in real time and to gradually perform driving support corresponding to the estimated vehicle state.

BRIEF DESCRIPTION OF THE DRAWINGS

FIG. 5 is a map showing one example of vehicle data encoded based on evaluation items;

FIG. 6(a) is a graph showing an example of changes in vehicle data including steering angle data, vehicle speed data, and depression data as a lower approximation set of data among condition attributes;

FIG. 6(b) is a diagram showing examples of decision attributes each of which is a vehicle state for each data collection period;

FIG. 7 is a diagram showing a manner in which definition rules are defined, and is a map showing one example of a lower approximation set, an upper approximation set, a corresponding decision attribute, and a corresponding vehicle state in each definition rule;

FIG. 8 is a map showing one example of a rule set consisting of a set of definition rules in which a condition attribute and a decision attribute are correlated with each other;

FIG. 9 is a flowchart showing one example of a vehicle state estimating procedure performed by a state estimation controller alone and recommended-action selecting procedure;

FIG. 12(a) is a map showing one example of condition attributes of vehicle data about a vehicle that is a target of estimation;

FIG. 12(b) is a map showing one example of rule sets recorded in an in-vehicle rule set database;

FIG. 13 is a map showing a recommended action database and one example of pieces of recommended action information recorded in a recommended action database;

FIG. 14(a) is a map showing one example of condition attributes of vehicle data about a vehicle that is a target of estimation;

FIG. 14(b) is a map showing one example of a manner in which definition rules are selected based on CI values;

FIGS. 15(a) and 15(b) are maps, each showing one example of condition attributes of vehicle data about a vehicle that is a target of estimation;

FIG. 15(c) is a map showing one example of a manner in which definition rules recorded in an in-vehicle rule set database are selected by means of a state estimation controller;

FIGS. 16(a) and 16(b) are maps, each showing one example of condition attributes of vehicle data about a vehicle that is a target of estimation;

FIG. 16(c) is a map showing one example of a manner in which definition rules recorded in an integrated rule set database are selected by means of an external terminal;

FIGS. 17(a) and 17(b) are maps, each showing one example of condition attributes of vehicle data about a vehicle that is a target of estimation;

FIG. 17(c) is a map showing one example of a manner in which definition rules of a pattern including new condition attributes are added by means of an external terminal;

FIGS. 18(a) and 18(b) are maps, each showing one example of condition attributes of vehicle data about a vehicle that is a target of estimation;

FIG. 18(c) is a map showing one example of a manner in which definition rules recorded in an in-vehicle rule set database are selected by means of a state estimation controller.

FIGS. 19(a) and 19(b) are maps, each showing one example of condition attributes of vehicle data about a vehicle that is a target of estimation;

FIG. 19(*c*) is a map showing one example of a manner in which definition rules recorded in an integrated rule set database are selected by means of an external terminal and showing one example of a manner in which definition rules of a pattern including new condition attributes are added by means of an external terminal;

DETAILED DESCRIPTION OF THE PREFERRED EMBODIMENTS

Referring to FIGS. 1 to 19, a description will be hereinafter given of an embodiment in which a vehicle state estimation system, a vehicle state estimation method, and a driving support system are embodied according to the present invention.

Figure 1:
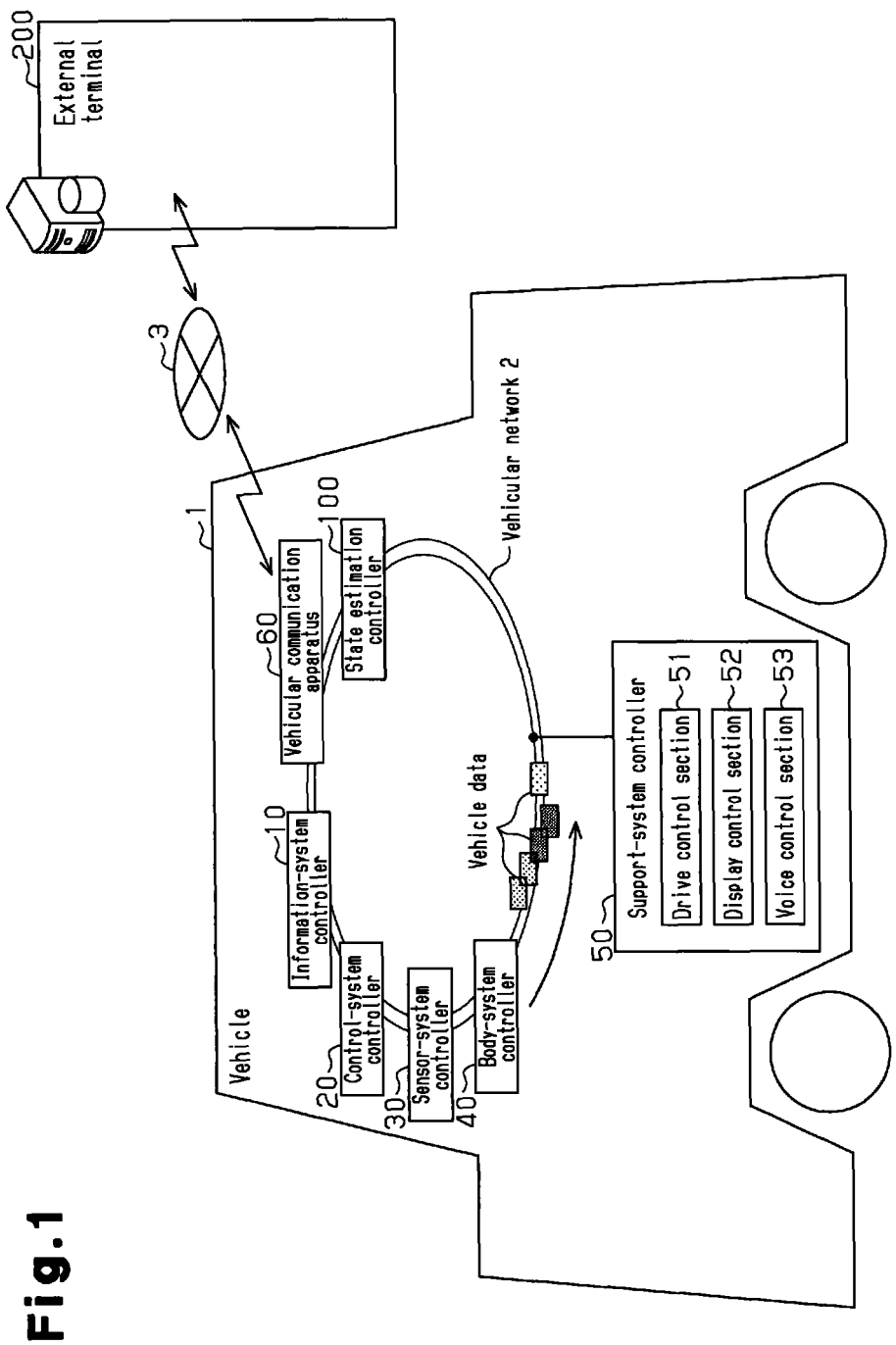
FIG. 1 shows an embodiment of a vehicle state estimation system, a vehicle state estimation method, and a driving support system according to the present invention, and is a block diagram illustrating a schematic structure of a vehicle and an external terminal to which the vehicle state estimation system, the vehicle state estimation method, and the driving support system are applied.

As shown in FIG. 1, a vehicle 1 to which the vehicle state estimation system, the vehicle state estimation method, and the driving support system of the present embodiment are applied has a vehicular network 2 that transmits and receives vehicle data to be transferred in the vehicle. For example, an information-system controller 10, a control-system controller 20, a sensor-system controller 30, and a body-system controller 40 are connected to the vehicular network 2.

The information-system controller 10 is a device that controls information-system equipment, such as a navigation system, and has a connection with, for example, a GPS that acquires latitude/longitude data showing the traveling position of the vehicle 1. For example, the information-system controller 10 successively acquires latitude/longitude data showing the latitude and the longitude of the vehicle 1, and transmits this acquired latitude/longitude data to the vehicular network 2. For example, the information-system controller 10 identifies the traveling area of the vehicle 1 as a unit, such as country, state, province, municipality, or block number, and transmits data showing this identified traveling area to the vehicular network 2. For example, the information-system controller 10 transmits data showing the operational on/off of the navigation system to the vehicular network 2.

For example, the control-system controller 20 is a device that controls a driving mechanism, such as an engine, mounted in the vehicle, and transmits control data, showing the control amount of each driving mechanism to the vehicular network 2.

The sensor-system controller 30 acquires detection results of sensors, such as an accelerator sensor, a brake sensor, a steering angle sensor, a vehicle speed sensor, an acceleration sensor, and a gyro sensor, and transmits data showing these acquired detection results to the vehicular network 2. For example, the sensor-system controller 30 detects on/off states of various switches by which lighting equipment, such as front lamps or winkers, mounted in the vehicle 1 is operated, and transmits data showing the detected contents to the vehicular network 2.

The body-system controller 40 is a device that controls body-system equipment, such as seat position, steering position, air conditioner, or door lock. For example, the body-system controller 40 transmits data showing a seat-position set value, a steering position, the preset temperature of an air conditioner, and the locked state of a door lock to the vehicular network 2.

A state estimation controller 100 that estimates a state of the vehicle 1 is mounted in the vehicle 1 of the present embodiment. In the present embodiment, the vehicular information terminal mentioned above is formed of the state estimation controller 100.

The state estimation controller 100 of the present embodiment acquires vehicle data that is data transmitted to the vehicular network 2 by means of, for example, the information-system controller 10, the control-system controller 20, the sensor-system controller 30, the body-system controller 40, and the like. The state estimation controller 100 estimates the state of the vehicle 1 by performing a predetermined calculation based on acquired vehicle data. The state estimation controller 100 of the present embodiment determines a recommended action to be recommended to the vehicle 1 in accordance with an estimated result. Thereafter, the state estimation controller 100 transmits determined data showing the recommended action to a support-system controller 50 that supports the operation of the driver of the vehicle 1 through the vehicular network 2. When the state estimation controller 100 of the present embodiment cannot identify the state of the vehicle 1 based on data and the like possessed by the controller 100, the state estimation controller 100 performs processing to identify the state of the vehicle 1 by cooperation with an external terminal 200 accessible through a vehicular communication apparatus 60 and through the external network 3. The external network 3 is made up of a mobile telephone network (WAN) by wide-area wireless communication, such as 3G, 3.9G, or 4G, or is made up of another network, such as WiFi or WiMax.

For example, the support-system controller 50 has a drive control section 51, which controls drive-system equipment and the like of the vehicle 1, in accordance with data showing a recommended action transmitted from the state estimation controller 100. For example, when the drive control section 51 receives deceleration-action-urging data transmitted from the state estimation controller 100, the drive control section 51 performs control to allow the steering to generate vibrations in order to urge the driver to decelerate the vehicle 1. For example, when the drive control section 51 receives deceleration-action-urging data, the drive control section 51 performs control to reduce the traveling speed of the vehicle 1. On the other hand, when the drive control section 51 receives data about executing the spin-avoidance control of the vehicle 1 from the state estimation controller 100, the drive control section 51 performs control to stabilize behaviors of the vehicle 1 while controlling the brake, the engine, and the like.

For example, the support-system controller 50 has a display control section 52 and a voice control section 53 both of which are used to provide the contents of data showing recommended actions transmitted from the state estimation controller 100 to the driver by means of images and voices. For example, when the display control section 52 receives data that urges the driver to reduce the amount of depression of the accelerator pedal transmitted from the state estimation controller 100, the display control section 52 outputs an image that urges the driver to release the accelerator pedal to a display device arranged in the vehicle 1. For example, when the voice control section 53 receives data that urges the driver to perform deceleration and gearshift transmitted from the state estimation controller 100, the voice control section 53 performs voice guidance that urges the driver to perform deceleration and gearshift by controlling an audio device based on the data.

Next, the configuration of the state estimation controller 100 and the configuration of the external terminal 200 will be described with reference to FIG. 2.

Figure 2:
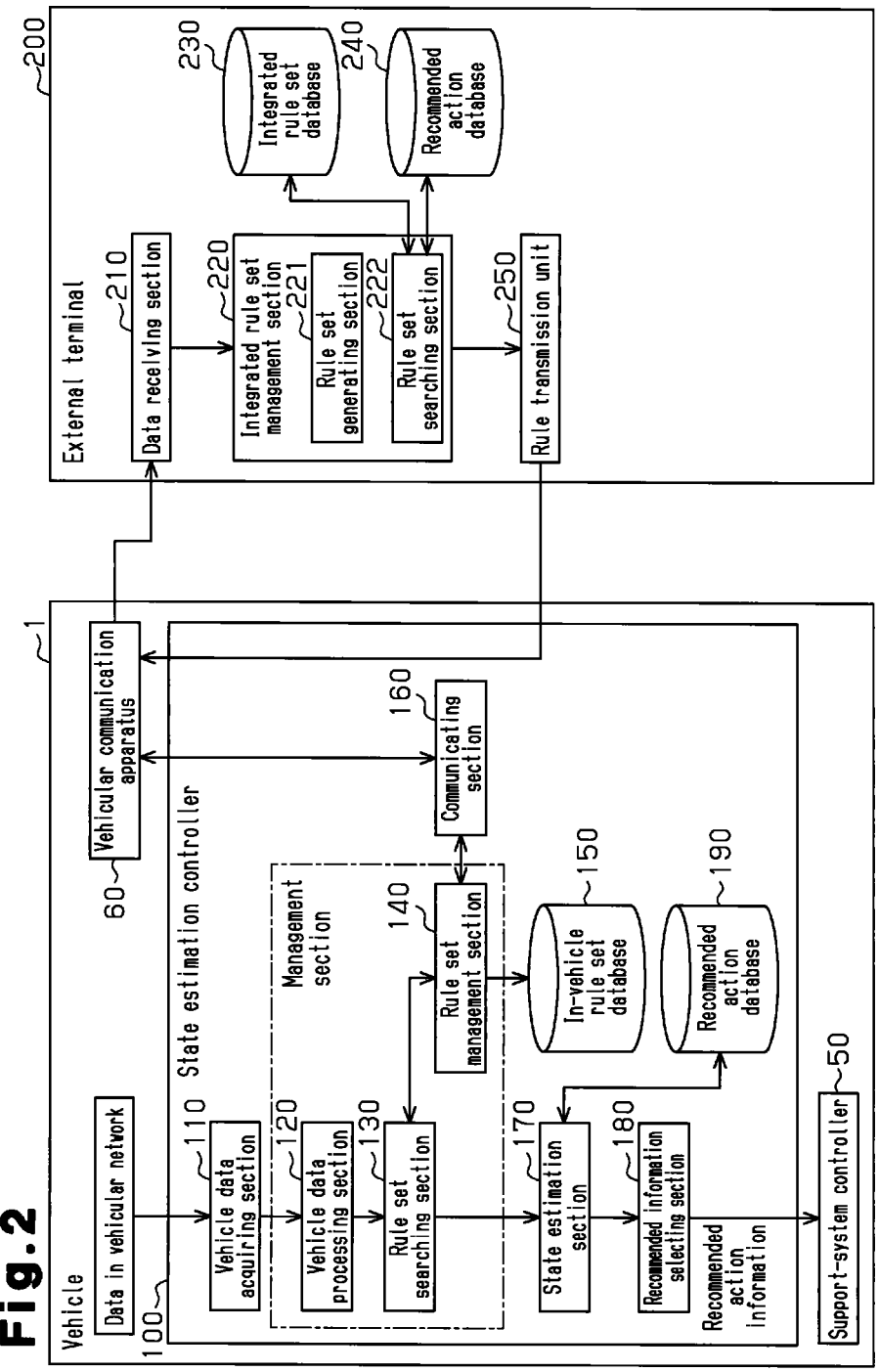
FIG. 2 is a block diagram illustrating a schematic structure of a state estimation controller mounted in the vehicle and an external terminal.

As shown in FIG. 2, the state estimation controller 100 of the present embodiment has a vehicle data acquiring section 110 that acquires vehicle data transmitted to the vehicular network 2. The vehicle data acquiring section 110 of the present embodiment acquires vehicle data transmitted to the vehicular network 2, for example, each time a predetermined data collection period elapses. For example, each time vehicle data is acquired, the vehicle data acquiring section 110 adds a time stamp showing the acquisition date of the vehicle data to the vehicle data. Thereafter, the vehicle data acquiring section 110 outputs vehicle data to which the time stamp has been added to a vehicle data processing section 120 that processes the vehicle data.

When the vehicle data is input, the vehicle data processing section 120 performs a vehicle-data encoding process, for example, as preprocessing prior to the estimation of the vehicle state. The vehicle data processing section 120 outputs vehicle data that has undergone preprocessing to a rule set searching section 130 that searches for a rule set consisting of a plurality of definition rules to define the state of the vehicle 1.

When vehicle data that has undergone preprocessing is input from the vehicle data processing section 120, the rule set searching section 130 searches for a single definition rule or a plurality of definition rules showing the state of the vehicle 1 correlating with the vehicle data from an in-vehicle rule set database 150 managed by a rule set management section 140 while using the vehicle data as a retrieval key.

For example, the rule set management section 140 manages a prerecorded rule set in the in-vehicle rule set database 150 when the vehicle 1 is shipped. For example, this rule set management section 140 grasps the type of the vehicle 1 or the classification of vehicle data transmitted to the vehicular network 2.

When the rule set searching section 130 searches for a definition rule, the rule set management section 140 inquires of the external terminal 200 about a definition rule capable of defining the vehicle 1 when the definition rule capable of defining the vehicle 1 is absent in the in-vehicle rule set database 150. When an inquiry is made, the rule set management section 140 offers data showing the type or the traveling area of the vehicle 1 to the external terminal 200.

Thereafter, the rule set management section 140 inquires of the external terminal 200 through the communicating section 160, the vehicular communication apparatus 60, and the external network 3, which form the state estimation controller 100. Thereafter, when a definition rule capable of defining the state of the vehicle 1 corresponding to the model or the traveling area of the vehicle 1 is delivered from the external terminal 200 in response to the inquiry, the rule set management section 140 outputs the delivered definition rule to the rule set searching section 130.

When the rule set searching section 130 acquires a plurality of definition rules each of which is capable of defining the state of the vehicle 1, the rule set searching section 130 outputs each of the acquired definition rules and vehicle data used as a retrieval key to a state estimation section 170 that estimates the state of the vehicle 1 based on the definition rule.

When a plurality of definition rules and vehicle data are input, the state estimation section 170 of the present embodiment estimates the state of the vehicle 1 through a calculation based on rough set theory. The state estimation section 170 of the present embodiment estimates the state of the vehicle 1, and then refers to a recommended action database 190 in which assumable states of the vehicle 1 and information showing a recommended action of the vehicle 1 that should be recommended corresponding to each vehicle state are prerecorded. Thereafter, the state estimation section 170 that has referred to the recommended action database 190 requests a recommended information selecting section 180 to select recommended action information correlated with an estimated state of the vehicle 1. The recommended information selecting section 180 acquires recommended action information that corresponds to a vehicle state estimated by the state estimation section 170 from the recommended action database 190. The state estimation section 170 acquires the recommended action information, and then transmits this information to, for example, the support-system controller 50 through the vehicular network 2. In response to this, the support-system controller 50 executes driving support that corresponds to the state of the vehicle 1. In the present embodiment, the driving support section consists of the support-system controller 50. Also, in the present embodiment, the driving support system is formed by the recommended information selecting section 180, the recommended action database 190, and the support-system controller 50.

On the other hand, for example, the external terminal 200 is arranged at a center that is capable of communicating with a plurality of types of vehicles, and includes a data receiving section 210 that receives data transmitted from the vehicle 1 and the like. The data receiving section 210 receives data showing inquiry contents and the type of the vehicle 1 from the state estimation controller 100, and then outputs this data to an integrated rule set management section 220 that manages a rule set group to identify the vehicle state of each type.

For example, the integrated rule set management section 220 of the present embodiment includes a rule set generating section 221 that generates a rule set to define each vehicle state by rough set theory that uses vehicle data transmitted from vehicles including the vehicle 1. The rule set generating section 221 records a generated rule set in the integrated rule set database 230 independently of, for example, a vehicle type, a time of day during which vehicle data is acquired, and a traveling environment. For example, the width of a road on which a vehicle serving as a vehicle-data acquisition source travels, the number of traffic lanes, a traveling area, and latitude/longitude are provided as the traveling environment. The integrated rule set management section 220 of the present embodiment identifies the traveling environment of the vehicle 1 based on, for example, latitude/longitude data or data showing the used state of a headlight among portions of vehicle data transmitted from the vehicle 1.

The integrated rule set management section 220 of the present embodiment has a rule set searching section 222 that selects a definition rule capable of identifying the state of the vehicle 1 from the integrated rule set database 230 when data showing the inquiry contents and the type of the vehicle 1 is input from the data receiving section 210. The integrated rule set management section 220 of the present embodiment selects a definition rule generated based on vehicle data acquired from a vehicle that is the same or similar in vehicle type to the vehicle 1 as the definition rule. For example, as the definition rule, the integrated rule set management section 220 of the present embodiment selects a definition rule that is common or approximate to the vehicle 1 in the time of day and in the traveling environment when vehicle data used as a definition source of definition rules managed by itself is acquired. The time of day of the vehicle data is identified based on, for example, a time stamp provided to the vehicle data. The traveling environment is identified based on, for example, latitude/longitude data among the portions of vehicle data.

The integrated rule set management section 220 selects a definition rule defined based on vehicle data acquired from a vehicle that is different in vehicle type from the vehicle 1 from the integrated rule set database 230 when a definition rule defined based on vehicle data acquired from a vehicle that is the same or similar in vehicle type is absent in the integrated rule set database 230. Likewise, when a definition rule that is common or approximate to the vehicle 1 in the time of day and in the traveling environment when vehicle data is acquired is absent in the integrated rule set database 230, the integrated rule set management section 220 selects a definition rule that is different in those factors.

Thereafter, the integrated rule set management section 220 delivers a selected rule set to the vehicle 1 about which an inquiry has been made through the rule transmission unit 250.

When a definition rule capable of estimating the state of the vehicle 1 is absent in the integrated rule set database 230, the integrated rule set management section 220 newly defines a definition rule using the vehicle data acquired from the vehicle 1 as a condition attribute in the rule set generating section 221. At this time, the rule set generating section 221 determines the state of the vehicle 1 that is a to-be-newly defined decision attribute, for example, by analyzing vehicle data acquired from the vehicle 1 or by monitoring subsequent changes in the state of the vehicle 1.

The rule set delivered from the external terminal 200 is thus acquired by the state estimation controller 100 of the vehicle 1, and is used for state estimation of the vehicle 1 made by the state estimation controller 100.

With reference to FIGS. 3 to 8, a detailed description will be hereinafter given of a manner in which a vehicle state is defined by the vehicle state estimation system, the vehicle state estimation method, and the driving support system of the present embodiment.

Figure 3:
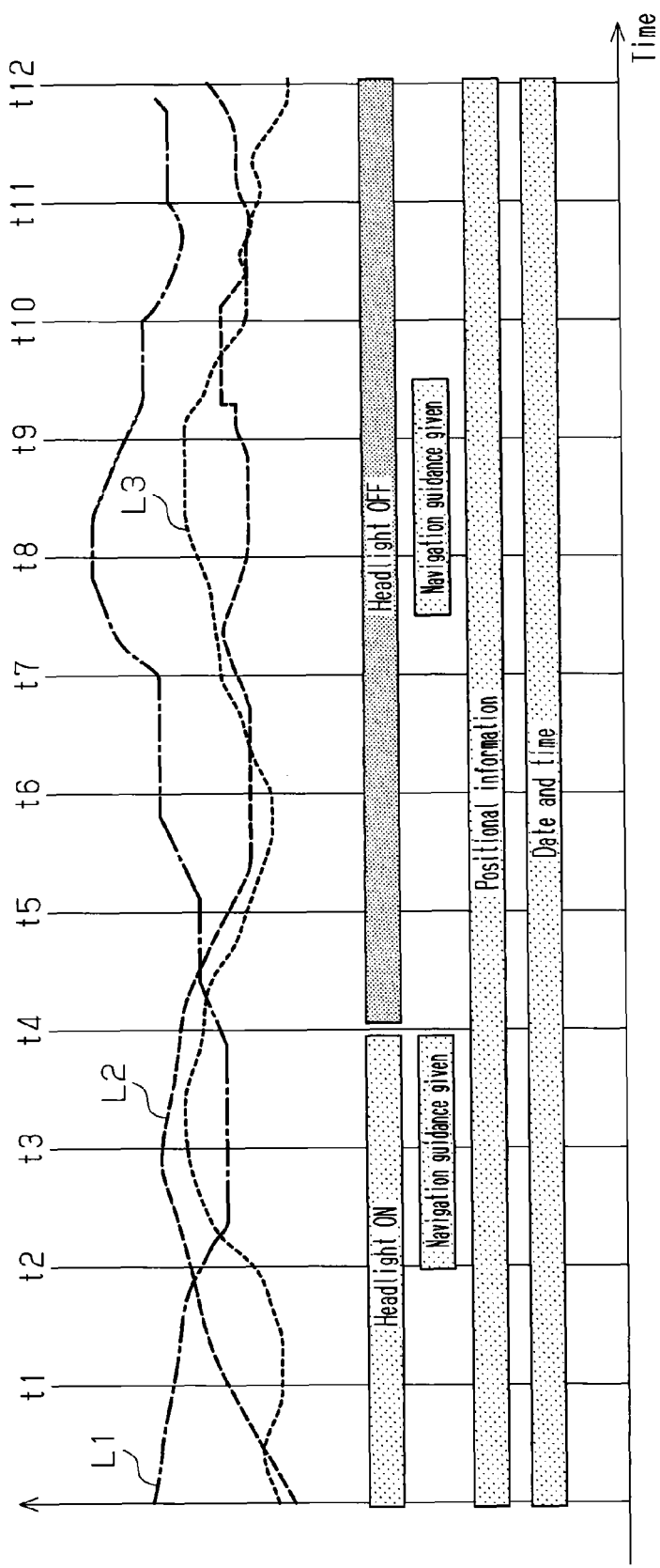
FIG. 3 includes a time chart showing, as examples of vehicle data, an example of changes in steering angle data, vehicle speed data, and depression data, and a time chart showing, as examples of vehicle data, an example of changes in data showing the on/off state of a headlight, data showing the operational state of a navigation system, latitude/longitude data, and data showing time.

As shown in FIG. 3, for example, vehicle data acquired by the vehicle data acquiring section 110 includes a plurality of kinds of time-series data. In this example, quantitatively variable data, such as steering angle data L1 showing changes in a steering angle of steering of the vehicle 1, vehicle speed data L2 showing changes in traveling speed of the vehicle 1, and depression data L3 showing changes in the amount of depression of the accelerator pedal of the vehicle 1, are included in the time-series data.

As shown in FIG. 3, discretely variable data, such as on/off of the headlight of the vehicle 1 and presence/absence of guidance by the navigation system, are included in the time-series data. Latitude/longitude data of the vehicle 1, date and time data, and the like are included in the time-series data.

Figure 4:
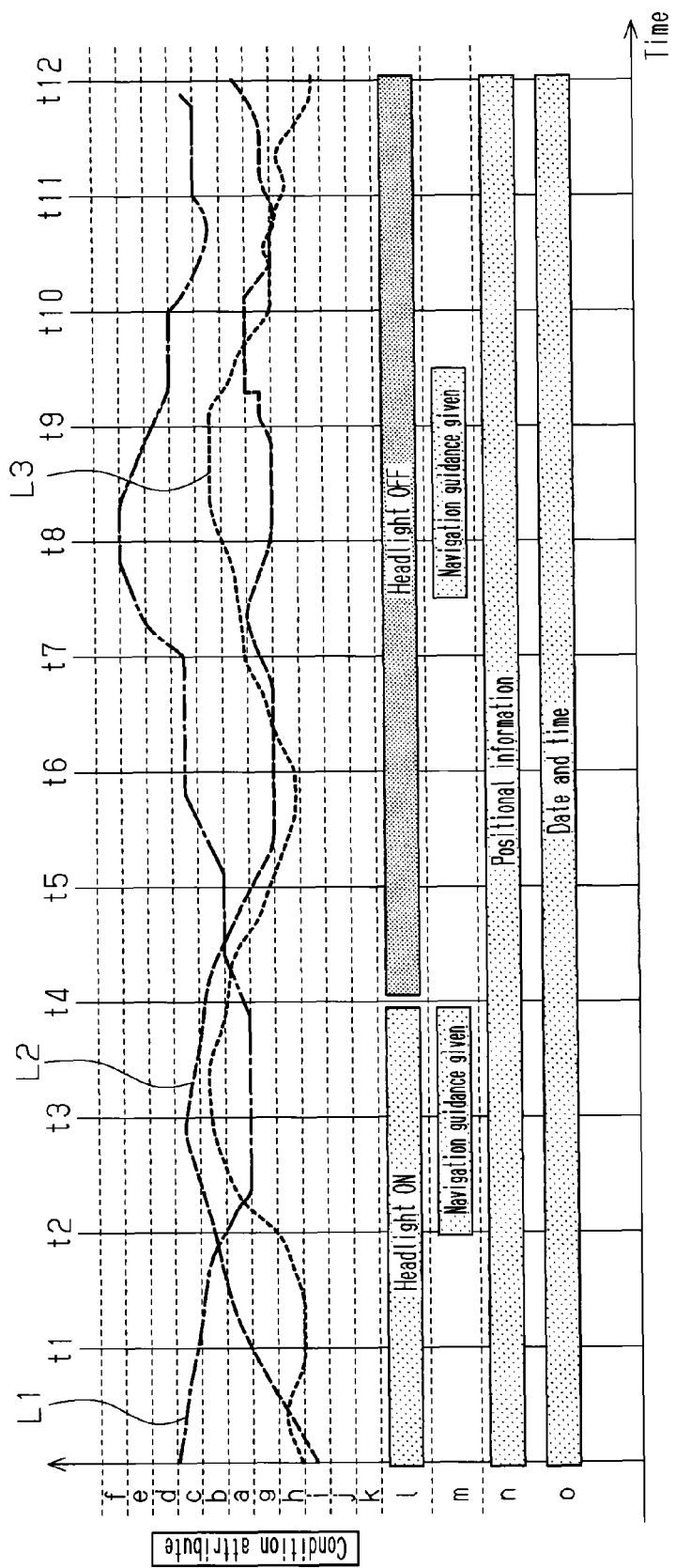
FIG. 4 is a diagram showing examples of evaluation items that evaluate vehicle data along with an example of changes in the vehicle data.

Accordingly, as shown in FIG. 4, the vehicle data processing section 120 of the present embodiment prescribes evaluation items a to f and g to k to discretely evaluate quantitatively variable data, such as steering angle data L1, vehicle speed data L2, and depression data L3, in accordance with its physical quantity. In the present embodiment, the evaluation items a to f and g to k are partitioned at equal intervals, for example, as illustrated in FIG. 4.

As shown in FIG. 4, the vehicle data processing section 120 of the present embodiment assigns variable 1 and variable m to data showing the operational state of the headlight and data showing the presence or absence of guidance by the navigation system, respectively. Likewise, the vehicle data processing section 120 assigns variable n and variable o to latitude/longitude data and date and time data, respectively.

Thereafter, the vehicle data processing section 120 of the present embodiment partitions each time-series data illustrated in FIG. 4 at equal intervals each of which has a predetermined time interval, and analyzes each time-series data for each partitioned time interval. In this analysis, the steering angle data L1 belongs to the region of the evaluation item c, the vehicle speed data L2 belongs to the region of the evaluation items g to i, and the depression data L3 belongs to the region of the evaluation item h, for example, in period t0-t1.

Therefore, the vehicle data processing section 120 encodes the quantitatively (continuously) variable time-series data by setting c and g to i among the evaluation items of the quantitatively variable time-series data at 1 in period t0-t1 as illustrated in FIG. 5. In contrast, with respect to d to f, a, b, j, and k among the evaluation items of the quantitatively variable time-series data, the vehicle data processing section 120 encodes the time-series data by setting these items at 0 from the conclusion that none of these data L1 to L3 belongs to these items.

In period t0-t1, the headlight is kept on, whereas the guidance of the navigation system is not performed as shown in FIG. 4.

Therefore, as illustrated in FIG. 5, in period t0-t1, the vehicle data processing section 120 sets variable 1 concerning the headlight at 1, and sets variable m concerning the navigation system at 0. The latitude/longitude data and the time data are always present, and therefore, 1 is given to corresponding variables n and o.

Encoding is performed in this way, and, as a result, the quantitatively variable time-series data and the discretely variable time-series data are encoded, for example, in each period of point in time t0 to point in time t12.

The vehicle data processing section 120 of the present embodiment prescribes each time-series data as an attribute value when the state of the vehicle 1 is estimated based on rough set theory, and prescribes evaluation items a to f and g to k and variables l to o as condition attributes.

As illustrated as states C1 to C11 in FIG. 5, the traveling environment, the vehicle speed, the steering angle, and the like change, and, accordingly, the state of the vehicle 1 dynamically changes in each period of point in time t0 to point in time t12. This state of the vehicle 1 has a correlation with attribute values, such as each data L1 to L3, the headlight operated in accordance with the traveling environment of the vehicle 1, and the operational state of the navigation system. In period t2-t3 and period t3-t4, the state of the vehicle 1 is a state C3, and values in which the data L1 to L3 are each encoded are also common in these periods.

Therefore, the vehicle data processing section 120 of the present embodiment prescribes the state of the vehicle 1 in each period t0-t12 as decision attributes s1 to s11 that correspond to condition attributes, respectively. For example, in period t2-t3 and period t3-t4, condition attributes are the same, and vehicle states are the same, and therefore the decision attribute showing the state of the vehicle 1 is s3 in each period.

In consideration of these characteristics, the state estimation section 170 of the present embodiment estimates the state of the vehicle 1 based on a condition attribute obtained by encoding the vehicle data transmitted to the vehicular network 2.

In other words, for example, gyro data L4 showing detection results of the gyro sensor, air conditioner data L5 showing the operational state of the air conditioner, and temperature data L6 showing detection results of the temperature sensor mounted in the vehicle 1 are included in the vehicle data even if states of vehicle 1 are the same as illustrated in FIG. 6(*a*) that is a figure corresponding to FIG. 4 shown above. Moreover, for example, c, g, h, i, and l are included in the condition attributes of period t0-t1, and f and j are further included therein.

On the other hand, the steering angle data L1, the vehicle speed data L2, the depression data L3, the on/off of the headlight, and the operational state of the navigation system in each period t0 to t12 are common between the changes in FIG. 4 shown above and those in FIG. 6. States of the vehicle 1 in each period t0 to t12 at this time are the states C1 to C11 as shown in FIG. 6(*b*), and are the same as the states of the vehicle 1 illustrated in FIGS. 4 and 5. Therefore, in this example, each vehicle data illustrated in FIG. 4 is data reliably included when states of the vehicle 1 are the states C1 to C11, respectively.

In contrast, data other than each vehicle data illustrated in FIG. 4, i.e., other data, such as gyro data L4, air conditioner data L5, and temperature data L6 illustrated in FIG. 6(*a*), are data having a possibility to be included in vehicle data that flow through the in-vehicle network 2 when states of the vehicle 1 are the states C1 to C11, respectively.

As illustrated in FIG. 7, for example, vehicle data collected when various vehicle states including the state of the vehicle 1 reach state C1 includes c, g, h, i, and l in common as shown as pattern a1 to pattern a12. In patterns a1 to a12, a, b, d, and the like are included independently of c, g, h, i, and l.

When the state of the vehicle 1 changes from the state C1 to the state Cn, the condition attribute 1 included in the state C1 disappears, for example, as illustrated as the patterns b1 to b3. In the state Cn, for example, c, g, h, and i are included in common.

Therefore, in the present embodiment, based on rough set theory, c, g, h, i, and l are defined as a lower approximation set consisting of a set of condition attributes that determine that the vehicle state is the state C1, i.e., it is the decision attribute s1. In other words, the lower approximation set is a basic set showing the reliability of a specific decision attribute. In contrast, condition attributes other than c, g, h, i, and l are defined as an upper approximation set consisting of condition attributes included when the vehicle state is the state C1. In other words, the upper approximation set is a basic set of condition attributes having a generating possibility corresponding to an approximation set. A combination of condition attributes of these lower and upper approximation sets and decision attributes that correspond to the condition attributes is defined as a definition rule about a vehicle state.

As illustrated in FIG. 8, in the present embodiment, based on vehicle data acquired from the vehicle 1 or from various vehicles including this vehicle 1, a rule set, which is a list of definition rules in which condition attributes showing vehicle data and decision attributes s1 to sn showing corresponding vehicle states are correlated with each other, is created. The decision attributes s1 to sn show various vehicle states, such as "a state in which the amount of depression of the accelerator pedal is excessive," "a traveling state at 60 km or more," "a traveling state having a spin occurrence possibility," "a deceleration state for entering an intersection," and "parking/stopping".

In the present embodiment, lower approximation sets of condition attributes that correspond to decision attributes s1 to sn are defined as C*1 to C*n, respectively. In other words, in the present embodiment, a plurality of portions of vehicle data that correspond to c, g, h, i, and l are shown by, for example, one piece of data showing C*1.

For example, a rule set illustrated in FIG. 8 is recorded in the in-vehicle rule set database 150 of the state estimation controller 100 mounted in the vehicle 1 of the present embodiment.

The rule set generating section 221 included in the external terminal 200 of the present embodiment collects vehicle data from a plurality of vehicles including the vehicle 1, and gradually generates a rule set illustrated in FIG. 8 based on collected vehicle data. Thereafter, the rule set generating section 221 additionally records a generated rule set in the integrated rule set database 230 independently of the vehicle type and the time of day.

Therefore, in the present embodiment, the integrated rule set database 230 mounted in the external terminal 200 is greater in the number of variations than the rule set recorded in the in-vehicle rule set database 150 mounted in the vehicle 1.

In the present embodiment, the state of the vehicle 1 is estimated based on the rule set recorded in the in-vehicle rule set database 150 and in the integrated rule set database 230 and based on vehicle data acquired in the vehicle 1, which is a target of vehicle state estimation. A calculation based on rough set theory is performed even when the state of the vehicle 1 is estimated.

With reference to FIGS. 9 to 19, a detailed description will be hereinafter given of operation of a vehicle state by the vehicle state estimation system, the vehicle state estimation method, and the driving support system of the present embodiment.

As shown in FIG. 9, in order to estimate a vehicle state, vehicle data transmitted to the vehicular network 2 is first acquired in the vehicle 1, which is a target of vehicle state estimation, as shown as step S100. As a result, vehicle data for a predetermined period, such as period t0-t1, is acquired as illustrated, for example, in FIG. 4. For example, this vehicle data acquisition is performed each time a predetermined data collection period elapses, and is performed while using, as a unit, a period, such as the period t0-t1, the period t1-t2 . . . , in the example of FIG. 4.

Thereafter, the acquired data is preprocessed, and, as a result, the vehicle data is encoded for each predetermined time interval in a manner illustrated in FIG. 4 (step S101). As a result, vehicle data acquired during a data collection period is encoded, and a condition attribute in the data collection period is calculated.

The condition attribute is calculated in this way, and, based on this condition attribute, a search is made for a definition rule recorded in the in-vehicle rule set database 150 (step S102). When this search is made, a determination is first made about whether a "lower approximation set" among definition rules recorded in the in-vehicle rule set database 150 is included in the condition attribute into which vehicle data is converted (step S103).

In this example, if condition attributes of vehicle data of the vehicle 1, which is a target of estimation, are, for example, c, g, h, and f as illustrated in FIG. 12(*a*), c, g, and h among the condition attributes coincide with the lower approximation set C*6 of a definition rule 6 recorded in the in-vehicle rule set database 150 (FIG. 9, step S103: YES). Therefore, c, g, and h are identified as a lower approximation set among the condition attributes of the vehicle data of the vehicle 1, which is a target of estimation, and the remaining f is identified as an upper approximation set.

Thereafter, a determination is made about whether f, which is an upper approximation set of the vehicle data of the vehicle 1, which is a target of estimation, is included in a, b, d, e, f, i, j, k, l, and m, which are an upper approximation set of the definition rule 6 (step S104). If the upper approximation set of the vehicle data of the vehicle 1, which is a target of estimation, is a combination of a plurality of condition attributes, a determination is made about whether the condition attributes are included in condition attributes that are components of the upper approximation set of the definition rule 6.

In this example, as shown in FIG. 12(*b*), the condition attribute f is included in the upper approximation set of the definition rule 6 recorded in the in-vehicle rule set database 150 (FIG. 9, step S104: YES).

As shown in FIG. 12(*b*), the lower approximation set including condition attributes (c, g, and h) of vehicle data of the vehicle 1, which is a target of estimation, is only the lower approximation set C*6 of the definition rule 6 (FIG. 9, step S105: YES). Therefore, when target of estimation data is c, g, h, and f, the definition rule 6 is selected as a definition rule to define the state of the vehicle 1.

Thereafter, the state of the vehicle 1 is estimated based on the definition rule 6 selected here (step S106). In other words, the decision attribute of the definition rule 6 is s6, and therefore, the state of the vehicle 1 is estimated to be, for example, "a state in which the amount of depression of the accelerator pedal is excessive."

Thereafter, a recommended action recorded in the recommended action database 190 is selected in accordance with the estimated vehicle state (step S107). In this example, when a map illustrated in, for example, FIG. 13 is recorded in the recommended action database 190, "reduction of accelerator depression" that is a recommended action corresponding to the decision attribute s6 is selected.

As shown as step S108 in FIG. 9, information showing this selected recommended action is output from the state estimation controller 100 to the support-system controller 50. As a result, for example, voice guidance or image guidance urges the driver of the vehicle 1 to perform "reduction of accelerator depression." Also, for example, control to cause the steering or the seat to generate vibrations or control to reduce the depression of the accelerator pedal is executed, and hence the vehicle 1 is decelerated. In accordance with the state of the vehicle 1 estimated in this way, a recommended action that suits the state of the vehicle 1 is performed, and the state of the vehicle 1 is induced to reach a state to be recommended.

On the other hand, it is assumed as illustrated in FIG. 14(*a*), which corresponds to FIG. 12(*a*) shown above, condition attributes of vehicle data that is the target of estimation are b, c, d, e, g, h, l, and m. The condition attributes of the vehicle data include a plurality of lower approximation sets C*1, C*5, C*6, C*8, and C*11 of the definition rule 1, the definition rule 5, the definition rule 6, and the definition rule 8 as illustrated in FIG. 14(*b*) (FIG. 9, step S105: NO).

Therefore, when a plurality of lower approximation sets that correspond to the condition attributes of the vehicle data as above, a definition rule having a high CI value, which designates a percentage formed by a lower approximation set in each definition rule is selected, i.e., the definition rule 1 of which the CI value is, for example, 0.385 is selected as illustrated in FIG. 14(*b*) (step S109).

On the other hand, it is assumed that as illustrated in FIG. 15(*a*), which corresponds to FIG. 12(*a*) shown above, condition attributes of the vehicle data, which is the target of estimation, are a, b, c, m, and l. As illustrated in FIG. 15(*c*), the condition attributes a, b, c, m, and l of the vehicle data are not included in any lower approximation set among the definition rules recorded in the in-vehicle rule set database 150 (FIG. 9, step S103: NO). In other words, the state of the vehicle 1 shown by this vehicle data is an unknown state that cannot be estimated by the state estimation controller 100 of the vehicle 1.

Figure 10:
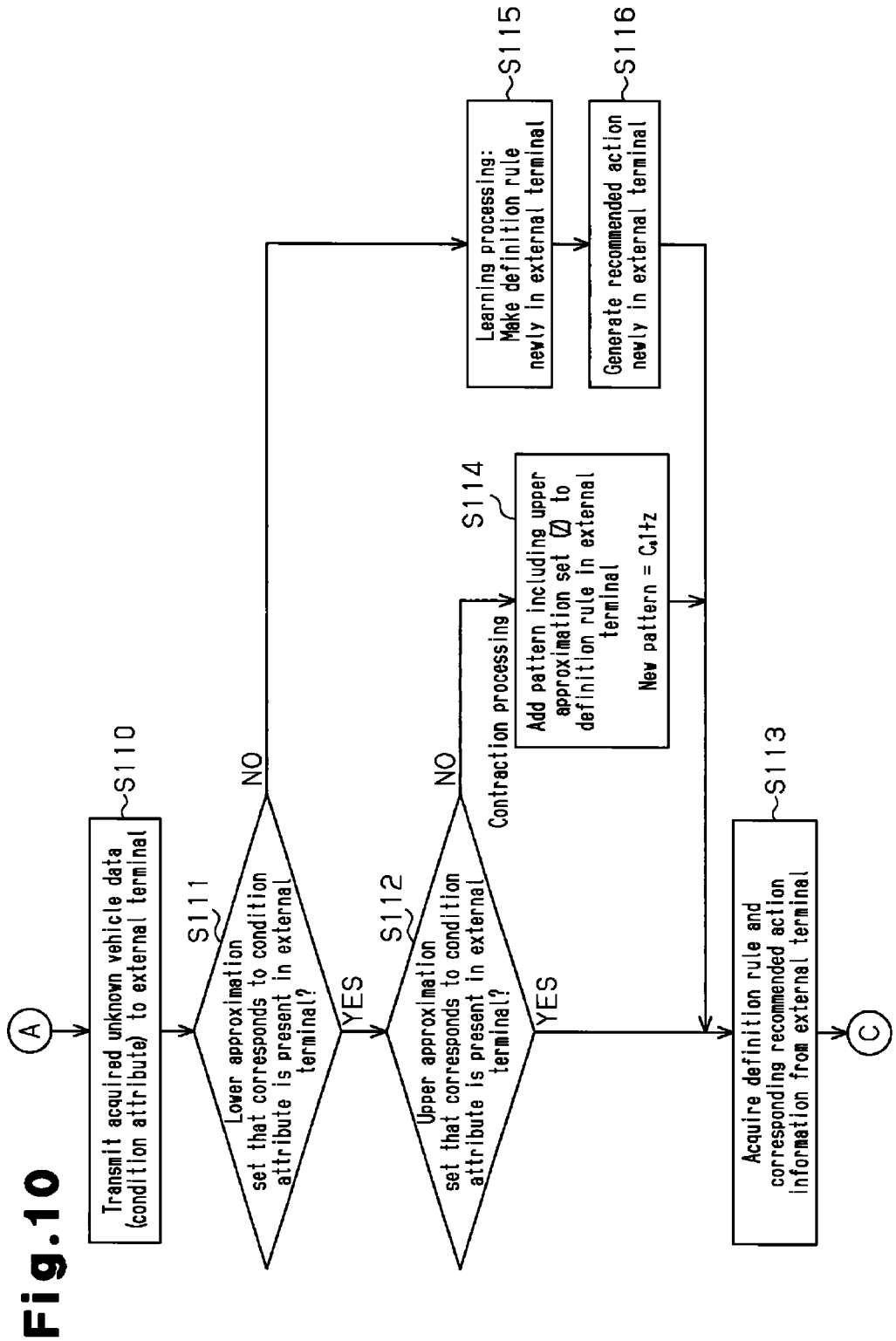
FIG. 10 is a flowchart showing one example of a vehicle state estimating procedure performed by cooperation between the state estimation controller and the external terminal.

Therefore, in the present embodiment, when a lower approximation set that has already been defined in the in-vehicle rule set database 150 is not included in changed condition attributes of vehicle data that is the target of estimation, a, b, c, m, and l, which are a combination of unknown condition attributes, are transmitted from the vehicle 1 to the external terminal 200 (FIG. 10, step S110).

Thereafter, first, at step S111, a determination is made about whether a lower approximation set that includes a part of the condition attributes transmitted from the vehicle 1 is present in the integrated rule set database 230 of the external terminal 200.

In this example, when a rule set shown in, for example, FIG. 16(*c*) is recorded in the integrated rule set database 230, the lower approximation set C*12 of the definition rule 12 recorded in the integrated rule set database 230 includes a, b, m, and l among the condition attributes transmitted from the vehicle 1 (FIG. 10, step S111: YES). Therefore, in this example, a, b, m, and l among the condition attributes transmitted from the vehicle 1 are handled as a lower approximation set, and c, which is not included in the lower approximation set C*12, is handled as an upper approximation set. In other words, the lower approximation set becomes a data management section.

As shown in FIG. 16(*c*), the upper approximation set c among the condition attributes transmitted from the vehicle 1 is included in the upper approximation set of the definition rule 12 recorded in the integrated rule set database 230 (FIG. 10, step S112: YES).

Therefore, the definition rule 12 is selected as a definition rule to estimate the state of the vehicle 1, and the definition rule 12 is extracted from the integrated rule set database 230, and recommended action information that corresponds to the definition rule 12 is extracted from the recommended action database 240 (step S113). Thereafter, these extracted the definition rule 12 and recommended action information are delivered from the external terminal 200 to the vehicle 1.

In the state estimation controller 100 of the vehicle 1, the state of the vehicle 1 is thus estimated based on the delivered definition rule 12 and recommended action information, and driving support is performed based on the recommended action information (steps S106 to S108). The definition rule 12 and the recommended action information delivered from the external terminal 200 are additionally recorded in the in-vehicle rule set database 150 and the recommended action database 190, respectively, by the rule set management section 140. Therefore, subsequently, the state estimation controller 100 mounted in the vehicle 1 can estimate the state of the vehicle 1 based on the definition rule 12 additionally recorded. This makes it possible to estimate a vehicle state based on the definition rule 12 without communicating with the external terminal 200.

It is assumed that, at step S112 shown in FIG. 10, the lower approximation set including a part of the condition attributes showing the vehicle data transmitted from the vehicle 1 is determined as being present in the integrated rule set database 230, and yet the corresponding upper approximation set is determined as being absent in the integrated rule set database 230. In this case, a definition rule that has a pattern capable of including the aforementioned upper approximation set is newly generated (step S112: NO, S114).

In other words, for example, it is assumed that as illustrated in FIG. 16(b), condition attributes showing vehicle data that cannot be defined by the vehicle 1 (by the state estimation controller 100) are a, b, m, l, and x. As shown in FIG. 16(c), a, b, m, and l among the condition attributes a, b, m, l, and x are common to C*12 included in the lower approximation set C*12 of the definition rule 12 recorded in the integrated rule set database 230 of the external terminal 200. However, the condition attribute x of the vehicle data transmitted from the vehicle 1 is not included in the upper approximation set of the definition rule 12 recorded in the integrated rule set database 230 of the external terminal 200 (FIG. 10, step S112: NO).

Therefore, in the present embodiment, a combination of the condition attributes a, b, m, l, and x that is an unrecorded pattern is not recorded in the integrated rule set database 230 as a new definition rule, and a pattern in which x is added to the lower approximation set C*12 consisting of the condition attributes a, b, m, and l is newly recorded. As a result, as shown in FIG. 17(c), which corresponds to FIG. 16(c) shown above, the definition rule 12 is updated by newly adding the condition attribute x to the upper approximation set of the definition rule 12 (FIG. 9, step S114). As a result, in the present embodiment, there is no need to newly generate a definition rule to derive decision attributes of the condition attributes a, b, m, l, and x, and it is possible to show the condition attributes a, b, m, l, and x by means of a pattern in which the condition attribute x is added to the lower approximation set C*12 already defined. Therefore, the amount of data required for recording can be made smaller than a case in which the pattern itself of the condition attributes a, b, m, l, and x is newly recorded in the integrated rule set database 230. For example, the pattern of these condition attributes is recorded by the rule set generating section 221. In the present embodiment, as described above, contraction processing in which vehicle data is transmitted and received and in which definition rules are created is performed while using an already-known lower approximation set consisting of a plurality of condition attributes as a data management section.

On the other hand, as shown in FIG. 10, if it is determined at step S111 that a lower approximation set corresponding to a condition attribute shown by vehicle data transmitted from the vehicle 1 is absent, the pattern of this condition attribute is additionally recorded in the integrated rule set database 230 as an undefined pattern (step S115). The state (decision attribute) of the vehicle 1 at this time is defined, for example, based on an analysis result of vehicle data transmitted from the vehicle 1 or based on the state of the vehicle 1 changed after the vehicle data is acquired. Recommended action information that corresponds to this state is newly generated, and the generated recommended action information is additionally recorded in the recommended action database 240 (step S116). Thereafter, the definition rule newly defined and the recommended action information are delivered from the external terminal 200 to the vehicle 1. Thereafter, in the vehicle 1, the delivered definition rule is additionally recorded in the in-vehicle rule set database 150.

It is assumed that at step S104 a lower approximation set corresponding to a condition attribute of vehicle data acquired in the vehicle 1 is present in the in-vehicle rule set database 150 of the vehicle 1, and yet an upper approximation set corresponding to a condition attribute of vehicle data is absent in the in-vehicle rule set database 150.

In other words, it is assumed that condition attributes showing the vehicle data of the vehicle 1 are, for example, c, g, h, and x as illustrated in FIG. 18(a). If so, as in FIG. 18(c), in which one example of the in-vehicle rule set database 150 mounted in the vehicle 1 is illustrated, c, g, and h among the condition attributes of the vehicle data are common to the lower approximation set C*6 of the definition rule 6. On the other hand, x among the condition attributes of the vehicle data is absent in the upper approximation set of the definition rule 6 of the in-vehicle rule set database 150. At this time, the corresponding lower approximation set is one of the lower approximation set C*6 of the definition rule 6 among the lower approximation sets recorded in the in-vehicle rule set database 150 (FIG. 11, step S120: YES).

Figure 11:
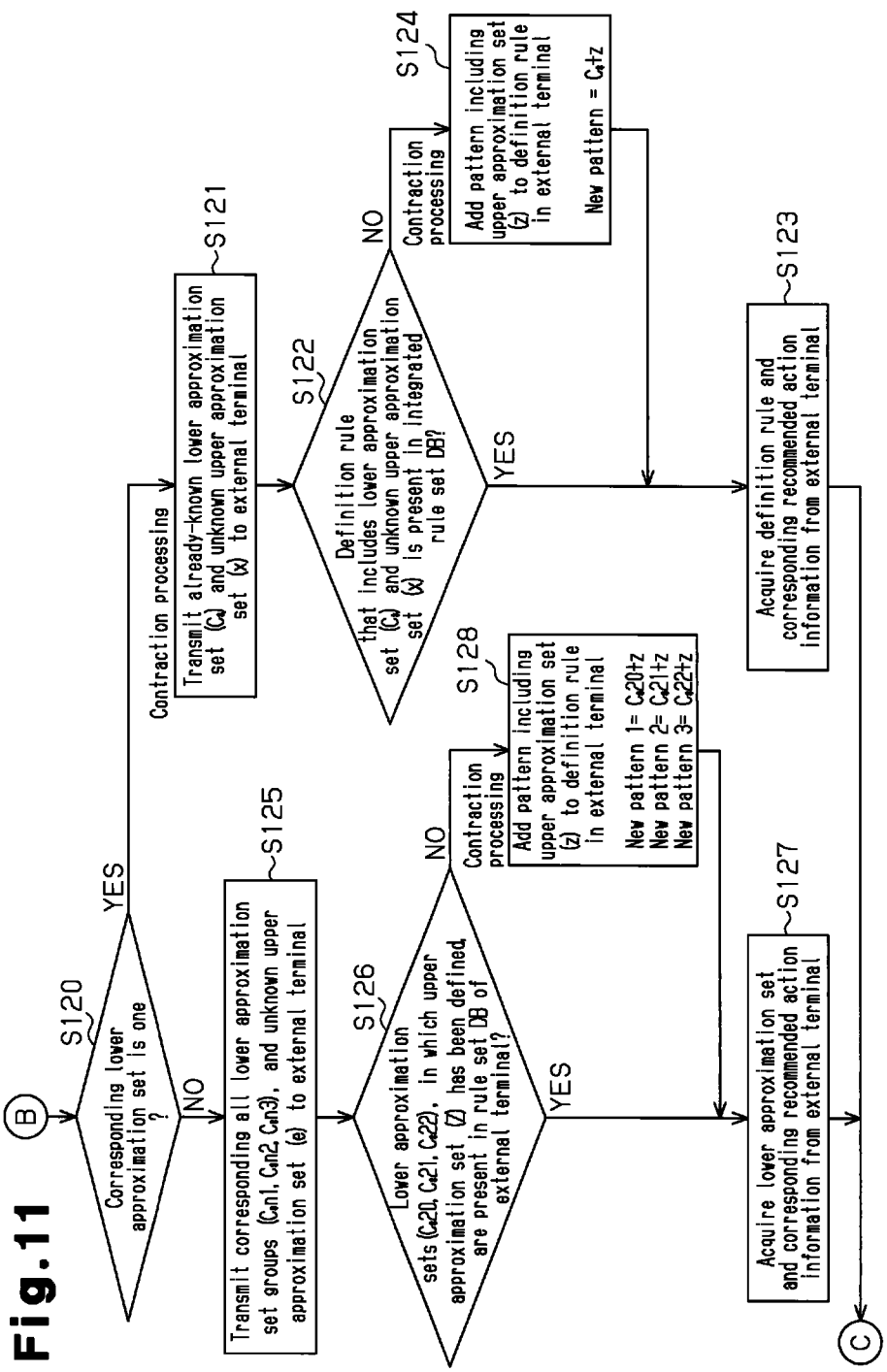
FIG. 11 is a flowchart showing one example of a vehicle state estimating procedure performed by cooperation between the state estimation controller and the external terminal.

In the present embodiment, the single lower approximation set C*6 showing a plurality of pieces of data c, g, and h among the condition attributes of the vehicle data and the condition attribute x unrecorded in the upper approximation set of the definition rule 6 of the in-vehicle rule set database 150 are transmitted from the vehicle 1 to the external terminal 200 (FIG. 11, step S121). In other words, in the present embodiment, all of the condition attributes c, g, h, and x of the vehicle data are not transmitted from the vehicle 1 to the external terminal 200, and the lower approximation set C*6 showing those c, g, and h and the unrecorded condition attribute x are transmitted instead of c, g and h. Therefore, the data amount of vehicle data transmitted from the vehicle 1 to the external terminal 200 is reduced.

Thereafter, a determination is made at step S122 of FIG. 11 about whether a definition rule of a pattern including the lower approximation set C*6 and the condition attribute x is present in the integrated rule set database 230.

Herein, as shown in, for example, FIG. 19(c), a pattern including the condition attribute x undefined in the in-vehicle rule set database 150 is recorded in the upper approximation set of the definition rule 6 recorded in the integrated rule set database 230 (FIG. 11, step S122: YES). Therefore, the definition rule 6, which includes this pattern, and corresponding recommended action information are delivered from the external terminal 200 to the vehicle 1 (step S123). Thereafter, in the vehicle 1, the delivered definition rule 6 replaces the definition rule 6 already recorded in the in-vehicle rule set database 150. As a result, subsequently, the state of vehicle data including the lower approximation set C*6 and the condition attribute x serving as an upper approximation set can be estimated by the vehicle 1 alone.

It is assumed that the condition attributes of vehicle data transmitted from the vehicle 1 are c, g, h, i, and z as shown in FIG. 18(b). At this time, c, g, h, and i among the condition attributes are common to the lower approximation set C*11 of the definition rule 11 already recorded in the in-vehicle rule set database 150. However, the condition attribute z is not included in the upper approximation set of the definition rule 11 of the in-vehicle rule set database 150.

In the integrated rule set database 230 of the external terminal 200, the condition attribute z is not defined in the upper approximation set of the definition rule 11 as shown in FIG. 19(c) (FIG. 11, S122: NO). Therefore, in the present embodiment, the condition attribute z is added to the upper approximation set of the definition rule 11 of the integrated rule set database 230 in an aspect illustrated in FIG. 17(c) shown above, and a pattern that includes the lower approximation set C*11 and the upper approximation set z is newly added to the definition rule 11 (step S124). As a result, the definition rule 11 recorded in the integrated rule set database 230 is updated. Thereafter, the definition rule 11 updated in this integrated rule set database 230 and corresponding recommended action information are delivered from the external terminal 200 to the state estimation controller 100. Thereafter, in the vehicle 1, this delivered definition rule 11 replaces the definition rule 11 already recorded in the in-vehicle rule set database 150. As a result, subsequently, the state of vehicle data including the lower approximation set C*11 and the condition attribute z serving as an upper approximation set can be estimated by the vehicle 1 alone. The processing at step S124 of FIG. 11 is also equivalent to contraction processing.

Further, it is assumed that it is determined that an upper approximation set that corresponds to condition attributes of vehicle data is absent (FIG. 9, step S104: NO), and a plurality of lower approximation sets including a part of the condition attributes of vehicle data are present in the in-vehicle rule set database 150 at step S120 shown in FIG. 11 (step S120: NO). At this time, for example, a plurality of lower approximation sets C*20, C*21, and C*22 present in the in-vehicle rule set database 150 are transmitted from the vehicle 1 to the external terminal 200 (step S125). Additionally, a condition attribute that is a part of the condition attributes of vehicle data and that is not included in the lower approximation sets C*20, C*21, and C*22 is also transmitted, i.e., z, which is one example of an upper approximation set of the upper approximation set of vehicle data, is also transmitted from the vehicle 1 to the external terminal 200. Likewise, at this time, in the present embodiment, all of the condition attributes showing the lower approximation sets C*20, C*21, and C*22 are not transmitted from the vehicle 1 to the external terminal 200, and only data showing the lower approximation sets C*20, C*21, and C*22 is transmitted. Therefore, the amount of transmission of data is made significantly smaller than when the condition attributes showing the lower approximation sets C*20, C*21, and C*22 are transmitted from the vehicle 1 to the external terminal 200.

Thereafter, in the external terminal 200, reference is made to the integrated rule set database 230, and a determination is made about whether z is present in the upper approximation sets of, for example, the definition rules 20 to 22 that include the lower approximation sets C*20, C*21, and C*22 transmitted from the vehicle 1 (step S126).

Thereafter, when the condition attribute z is present in the upper approximation set of, for example, the definition rule 20 (step S126: YES), the definition rule 20 and corresponding recommended action information are transmitted from the external terminal 200 to the vehicle 1 (step S127). Thereafter, in the vehicle 1, the delivered definition rules 20 to 22 replace the definition rules 20 to 22 already recorded in the in-vehicle rule set database 150. As a result, subsequently, a vehicle data state including the lower approximation set C*20 and the condition attribute z serving as an upper approximation set can be estimated by the vehicle 1 alone.

On the other hand, when the condition attribute z is absent in any one of the upper approximation sets of the definition rules 20 to 22 recorded in the integrated rule set database 230 (step S126: NO), the condition attribute z is added to the pattern of the upper approximation sets of the definition rules 20 to 22 (step S128). In other words, the processing of step S128 is also contraction processing. As a result, subsequently, it is possible to recognize that, in the external terminal 200, vehicle data including the lower approximation sets C*20 to 22 and the condition attribute z serving as an upper approximation set is data that corresponds to the definition rules 20 to 22, to which a new pattern has been added.

Thereafter, the definition rules 20 to 22, to which a new pattern has been added, and corresponding recommended action information are delivered from the external terminal 200 to the vehicle 1. Thereafter, in the vehicle 1, the delivered definition rules 20 to 22 replace the definition rules 20 to 22 already recorded in the in-vehicle rule set database 150. As a result, subsequently, a vehicle data state including the lower approximation sets C*20 to 22 and the condition attribute z serving as an upper approximation set can be estimated by the vehicle 1 alone (step S125).

As described above, according to the vehicle state estimation system, the vehicle state estimation method, and the driving support system according to the present embodiment, the following advantages are achieved.

(1) A definition rule to define a vehicle state is defined by rough set theory in which a plurality of portions of vehicle data are condition attributes and in which a vehicle state is a decision attribute. Based on a rule set that is a set of defined definition rules and based on vehicle data acquired from the vehicle 1, which is a target of estimation, the state of the vehicle 1 is estimated. As a result, it is possible to define various vehicle states that have correlation with an uncountable number of portions of vehicle data by specific vehicle data, and it is possible to estimate a vehicle state based on the defined definition rules and minimum necessary vehicle data. Therefore, the amount of data of definition rules to define vehicle states is significantly reduced, and the load necessary to estimate a vehicle state using the definition rule is significantly reduced. Therefore, it is possible to estimate a gradually changing vehicle state with a higher real-time capability.

(2) When undefined vehicle data other than condition attributes of specific decision attributes defined by definition rules is included in vehicle data of the vehicle 1, which is a target of estimation, contraction processing is performed in which a plurality of condition attributes that correspond to the specific decision attributes are handled as a subset. Thereafter, data in which undefined vehicle data is added to the contracted condition attributes is used as a data management section. As a result, the amount of data to prescribe a definition rule is reduced, and the amount of communication is reduced when a definition rule is defined or when a vehicle state is estimated. This makes it possible to define or estimate a vehicle state while using a minimum amount of data even if a sample serving as a condition attribute is a gradually changing vehicle data as above.

(3) A vehicle state is estimated by cooperation between the state estimation controller 100 mounted in the vehicle 1 and the external terminal 200 communicable with the state estimation controller 100. When a definition rule capable of estimating the state of the vehicle 1 is absent in the in-vehicle rule set database 150, the state estimation controller 100 makes an inquiry based on the vehicle data of a vehicle that is a target of estimation to the external terminal 200. The external terminal 200 narrows definition rules that correspond to vehicle data of the inquiry, and delivers the narrowed definition rule to the state estimation controller 100. Therefore, it is possible for the state estimation controller 100 to estimate the vehicle state based on the definition rule delivered from the external terminal 200, and it is possible for the state estimation controller 100 to estimate the vehicle state even if it is a vehicle state incapable of being estimated by definition rules of the state estimation controller 100. As a result, it is possible to estimate the state of the vehicle 1 in detail and variously. When a plurality of definition rules capable of estimating the state of the vehicle 1 are present in the in-vehicle rule set database 150, an inquiry from the state estimation controller 100 to the external terminal 200 is made based on the vehicle data of a vehicle that is a target of estimation. Thereafter, definition rules that correspond to vehicle data of the inquiry are delivered from the external terminal 200 to the state estimation controller 100. Therefore, it is possible to narrow definition rules used for vehicle states in the external terminal 200 even if it is difficult to narrow the definition rules used for vehicle states by the state estimation controller 100 alone. As a result, it is possible to estimate the state of the vehicle 1 with higher accuracy. These also make it possible to bring definition rules possessed by the state estimation controller 100 into a minimum necessary status while estimating the vehicle state in detail or variously through cooperation between the state estimation controller 100 and the external terminal 200.

(4) When a condition attribute that corresponds to vehicle data of the vehicle 1, which is a target of estimation, is absent in the in-vehicle rule set database 150, the state estimation controller 100 transmits this vehicle data to the external terminal 200 for the inquiry. Responding to the inquiry, the external terminal 200 selects a definition rule, in which vehicle data received from the state estimation controller 100 is defined as a condition attribute, from the integrated rule set database 230, and delivers the selected definition rule to the state estimation controller 100. As a result, it is possible to estimate a vehicle state even if it is an unknown condition attribute for the state estimation controller 100, and it is possible to allow the state estimation controller 100 to have a definition rule capable of estimating the vehicle state based on that condition attribute in a late-started manner.

(5) There is a possibility that vehicle data acquired in the vehicle 1 includes condition attributes that correspond to a lower approximation set among definition rules recorded in the in-vehicle rule set database 150 and, on the other hand, includes undefined condition attributes that correspond to an upper approximation set among these definition rules. At this time, the state estimation controller 100 transmits data showing the lower approximation set and data showing the undefined condition attributes that correspond to the upper approximation set to the external terminal 200. As a result, the state estimation controller 100 is not required to transmit all the data included in the lower approximation set to the external terminal 200, but is merely required to transmit one piece of data capable of showing the lower approximation set and data about the undefined upper approximation set among portions of vehicle data to the external terminal 200. As a result, the amount of data transmitted by the state estimation controller 100 to the external terminal 200 is significantly reduced.

(6) When a definition rule that includes condition attributes included in a lower approximation set received from the state estimation controller 100 and undefined condition attributes in the in-vehicle rule set database 150 is present in the integrated rule set database 230, the external terminal 200 performs processing to deliver this definition rule to the state estimation controller 100. As a result, it is possible for the state estimation controller 100 to estimate a vehicle state based on the definition rule delivered from the external terminal 200. There is a possibility that a definition rule that includes condition attributes included in the lower approximation set received from the state estimation controller 100 and undefined condition attributes in the in-vehicle rule set database 150 is absent in the integrated rule set database 230 of the external terminal 200. At this time, the external terminal 200 performs processing to newly define a rule in which the undefined condition attributes are added to an upper approximation set that is a subset included as having a generation possibility in a definition rule recorded in the integrated rule set database 230. As a result, subsequently, it is possible for the external terminal 200 to estimate a vehicle state based on vehicle data including condition attributes that are undefined condition attributes, and a definition rule capable of defining vehicle data is extended. In addition, a definition rule capable of including a pattern of a new condition attribute is defined in an aspect in which the undefined condition attribute is added to a lower approximation set of already-made definition rules in the integrated rule set database 230. Therefore, it is possible to define a definition rule capable of including a pattern of a new condition attribute by less data, and the amount of data of the integrated rule set database 230 is reduced.

(7) When vehicle data of the vehicle 1 includes both a lower approximation set and condition attributes undefined in a definition rule including the lower approximation set and when a plurality of definition rules including the lower approximation sets is present in the in-vehicle rule set database 150, the lower approximation sets and undefined condition attributes are transmitted from the state estimation controller 100 to the external terminal 200. Therefore, the state estimation controller 100 is not required to transmit all the data included in the lower approximation sets to the external terminal 200, but is merely required to transmit one piece of data capable of showing the lower approximation sets and data about undefined upper approximation sets among the portions of vehicle data to the external terminal 200. As a result, the amount of data transmitted by the state estimation controller 100 to the external terminal 200 is significantly reduced.

(8) When the external terminal 200 itself has one definition rule including condition attributes included in any one of the lower approximation sets transmitted from the state estimation controller 100 and condition attributes undefined in the in-vehicle rule set database 150, this one definition rule is allowed to be delivered from the external terminal 200 to the state estimation controller 100. As a result, it is possible to estimate a vehicle state based on a definition rule that is identified and delivered by the external terminal 200 even if the state estimation controller 100 cannot narrow the definition rule used to estimate the vehicle state by itself. Also, there is a possibility that the external terminal 200 does not have a definition rule capable of including condition attributes undefined in the in-vehicle rule set database 150. At this time, the external terminal 200 is allowed to identify each definition rule including a plurality of lower approximation sets transmitted from the state estimation controller 100 among the definition rules possessed by the external terminal 200. Additionally, the external terminal 200 is allowed to define a definition rule capable of including a pattern of a new condition attribute by adding the undefined condition attribute to each upper approximation set of each identified definition rule. Therefore, subsequently, it is possible for the external terminal 200 to estimate a vehicle state based on vehicle data including a condition attribute that has been an undefined condition attribute. As a result, a definition rule capable of defining vehicle data is extended.

(9) The integrated rule set management section 220 of the external terminal 200 is allowed to manage a rule set independently of at least one factor among the type of a vehicle serving as a source of vehicle data acquisition, a time of day when vehicle data is acquired, and a traveling environment. When the external terminal 200 receives an inquiry from the state estimation controller 100, the external terminal 200 identifies at least one factor among the type of the vehicle 1, the time of day when vehicle data is acquired, and the traveling environment prior to the selection of a definition rule to be delivered. Further, the external terminal 200 selects a definition rule to be delivered to the state estimation controller 100 from the common or similar rule sets of the identified factor. As a result, the accuracy of vehicle state estimation based on a definition rule is improved while using this definition rule defined based on a large indefinite number of portions of vehicle data defined based on a plurality of kinds of vehicle operations.

(10) The state estimation controller 100 is allowed to prescribe an evaluation item that discretely evaluates the physical quantity of a plurality of pieces of time-series data showing changes in the physical quantity of a vehicle as the condition attribute. Additionally, the state estimation controller 100 is configured to use a combination of evaluation items to which a plurality of pieces of time-series data during a specific period belong as a condition attribute about the vehicle 1, which is a target of estimation. As a result, it is possible to define a definition rule by combining physical quantities of time-series data that occupies a large majority as vehicle data, and is possible to estimate a vehicle state through acquisition of this time-series data.

(11) The state estimation controller 100 is configured to collect vehicle data each time a predetermined data collection period elapses and to estimate a vehicle state based on the collected vehicle data. Therefore, it is possible for the state estimation controller 100 to periodically collect gradually-changing vehicle data, and it is possible to periodically estimate a gradually changing vehicle state based on the collected vehicle data.

(12) The state estimation controller 100 of the vehicle 1 is allowed to have the recommended action database 190 in which recommended action information to be recommended in accordance with the state of the vehicle 1 is recorded. Additionally, the support-system controller 50 that is a constituent of the driving support section performs driving support based on recommended action information selected by the recommended information selecting section 180. As a result, it is possible to estimate a vehicle state in real time and to gradually perform driving support corresponding to this estimated vehicle state.

The aforementioned embodiment may be modified as follows.

Only the encoding of vehicle data is performed as preprocessing by the vehicle data processing section 120. Without being limited to this, processing, such as the normalizing or averaging of the vehicle data, may be performed as the preprocessing prior to the encoding of the vehicle data. According to this, vehicle data is converted into condition attributes based on, for example, whether the middle value of normalized vehicle data or the mean value of vehicle data belongs to an evaluation item that has been discretely evaluated.

Figure 20:
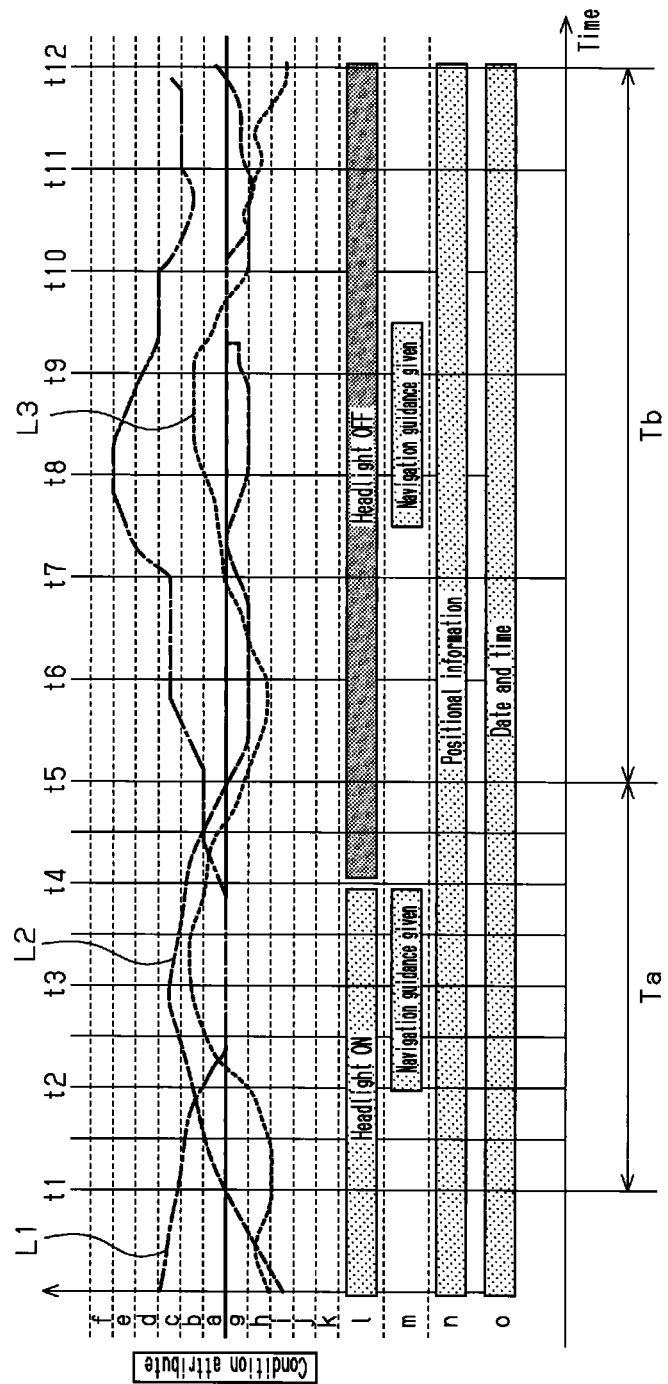
FIG. 20 shows another embodiment of a vehicle state estimation system, a vehicle state estimation method, and a driving support system according to the present invention, and is a graph showing an example of changes in vehicle data acquired by using a dynamically changed data collection period as a unit.

With respect to the data collection unit of vehicle data, each time-series data is equally partitioned at predetermined time intervals as illustrated in FIG. 4, and the condition attribute of each time-series data is found for each partitioned time interval. Without being limited to this, as illustrated in, for example, FIG. 20, which corresponds to FIG. 4 shown above, the collection period of each vehicle data may be shortened, for example, in a period Ta, during which the traveling speed of the vehicle 1 shown by vehicle speed data L2 is in a predetermined high-speed area. In the period Tb, during which the traveling speed of the vehicle 1 is in a predetermined low-speed area, the collection period of each vehicle data may be extended. According to this, the collection period of vehicle data is dynamically changed in accordance with the traveling speed of the vehicle 1, and, consequently, the vehicle state estimation period based on the collected vehicle data is changed dynamically. As a result, it is possible to more flexibly collect vehicle data and to more flexibly estimate a vehicle state based on the collected vehicle data. It is also possible to change the vehicle data collection period in the same way, for example, when the amount of variation of the steering angle data L1 or the depression data L3, without being limited to the vehicle speed data L2, exceeds a predetermined amount of variation or when the amount of variation of time-series data showing other factors, such as acceleration, exceeds a predetermined amount of variation.

The steering angle data L1, the vehicle speed data L2, the depression data L3, data showing the on/off of the headlight, and data showing the presence or absence of the operation of the navigation system are prescribed as vehicle data forming the lower approximation set. Without being limited to this, vehicle data forming the lower approximation set may be, for example, data showing changes in acceleration, control data to control the amount of fuel supply to the engine, temperature data, or data showing the operational state of a wiper. In brief, it is only necessary for vehicle data forming the lower approximation set to be data transmitted into the vehicular network 2 and to be data included in common when the vehicle is in a specific state through analysis based on rough set theory.

A vehicle state is periodically estimated each time vehicle data is acquired by a predetermined data collection unit. Without being limited to this, a vehicle state may be estimated, for example, on the condition that the difference value of vehicle data acquired by the data collection unit has exceeded a predetermined difference threshold value. According to this, in the vehicle data illustrated in, for example, FIG. 4, a vehicle state is estimated, for example, when a difference of at least one piece of data among the steering angle data L1, the vehicle speed data L2, and the depression data L3 exceeds the difference threshold value in two consecutive periods of period t0-t1 and period t1-t2. According to this, only when a change occurs in the vehicle data, i.e., only when the possibility that a change will occur in the vehicle state shown by the vehicle data is high, the vehicle state is estimated. As a result, it is possible to estimate a vehicle state only when a change is predicted in the vehicle state. In contrast, a vehicle state may be estimated on the condition that a difference between consecutive portions of vehicle data is below or equal to a difference threshold value. According to this, a vehicle state is estimated only when the difference of the vehicle data falls to or below the difference threshold value and only when the possibility that the vehicle state shown by the vehicle data will be stable is high. As a result, it is possible to reduce the estimation frequency of a gradually changing vehicle state, and a calculation load resulting from vehicle state estimation is reduced. For example, a plurality of portions of vehicle data may be collected during a predetermined period, and a vehicle state may be estimated when the physical quantity of specific vehicle data among the collected portions of vehicle data becomes minimal. According to this, it is possible to estimate a vehicle state on the condition that the vehicle state is predicted to be changed.

Figure 21:
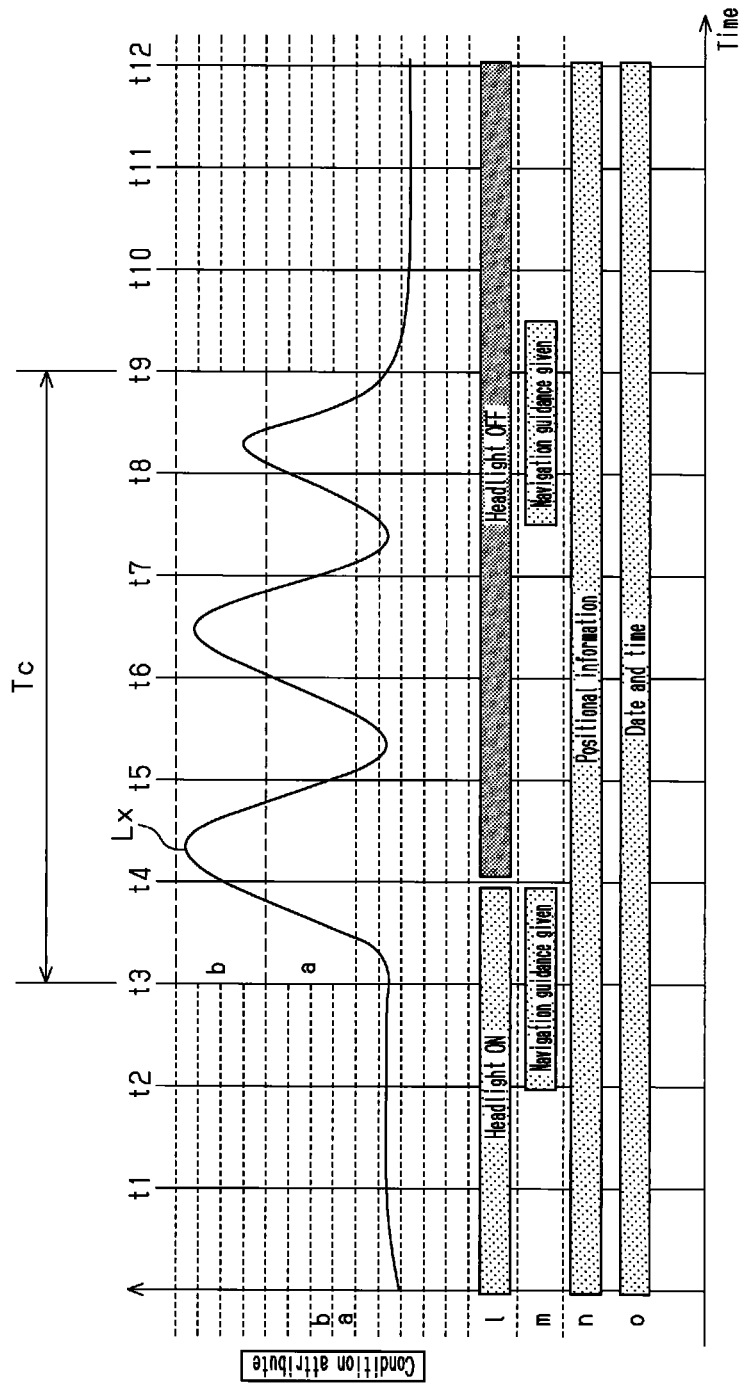
FIG. 21 shows another embodiment of a vehicle state estimation system, a vehicle state estimation method, and a driving support system according to the present invention, and is a graph showing an example of changes in vehicle data evaluated by dynamically-changed evaluation items.
Figure 22:
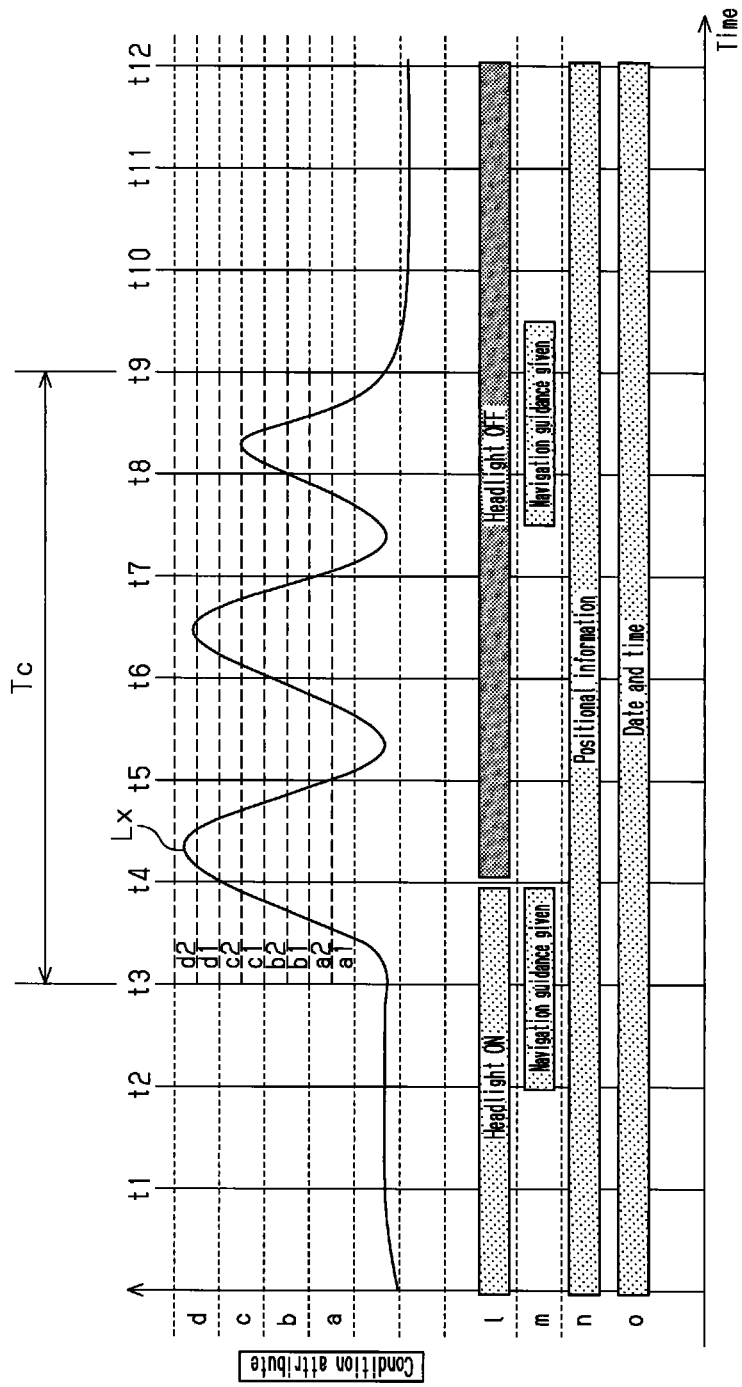
FIG. 22 shows another embodiment of a vehicle state estimation system, a vehicle state estimation method, and a driving support system according to the present invention, and is a graph showing an example of changes in vehicle data evaluated by dynamically-changed evaluation items.

The evaluation items a to f and g to k, which are used to convert vehicle data showing the physical quantity of a vehicle state into condition attributes, are partitioned at equal intervals. Without being limited to this, when data Lx, which forms a lower approximation set in a certain decision attribute, is present, e.g., when the amount of variation of data Lx exceeds a predetermined threshold value in period Tc, the areas of, for example, the evaluation items a and b, which include data Lx, may be dynamically widened as shown in, for example, FIG. 21, which corresponds to FIG. 4. According to this, when a rapid variation occurs in data Lx, the number of condition attributes shown by data Lx increases needlessly, and a vehicle state that is a decision attribute corresponding to the condition attribute is restrained from being subdivided. In contrast, as shown in, for example, FIG. 22, which corresponds to FIG. 4, when data Lx, which forms a lower approximation set in a certain decision attribute, is present, e.g., when the amount of variation of data Lx exceeds a predetermined threshold value in period Tc, the areas of, for example, the evaluation item a and the like that include data Lx may be subdivided in such a manner as a1 and a2. According to this, it is possible to prescribe a condition attribute showing the state of the vehicle 1 in detail when a rapid variation occurs in data Lx. As a result, when a sudden change is predicted to occur in the state of the vehicle 1, a pattern of a decision attribute corresponding to the condition attribute is generated in detail, and, consequently, it is possible to estimate the vehicle state in more detail.

The vehicle data is encoded into 0 and 1 based on whether the vehicle data belongs to the areas that correspond to the evaluation items a to f and g to k. Without being limited to this, when vehicle speed data L2 is bridged between the evaluation items a and b in the ratio of, for example, 5 to 5 in period t2-t3 as shown in, for example, FIG. 4, vehicle speed data L2 may be converted in such a manner as about 0.5 with respect to the evaluation item (condition attribute) a and about 0.5 with respect to the evaluation item b by means of the fuzzy membership function. According to this, it is possible to perform conversion from the vehicle data to the condition attribute more precisely, and it is possible to prescribe a decision attribute corresponding to the condition attribute in more detail, and, consequently, it is possible to estimate the vehicle state in more detail. A vehicle data analysis technique that uses the fuzzy membership function is described in Japanese Published Unexamined Patent Application No. 2005-283239 (non-patent document), and therefore a detailed description of this is omitted.

The definition rule is managed in the integrated rule set database 230 independently of the traveling environment, the time of day, and the vehicle type. Without being limited to this, the definition rule may be managed independently of at least one factor among the traveling environment, the time of day, and the vehicle type. Alternatively, the definition rule may be managed without adding the traveling environment, the time of day, and the vehicle type.

When a definition rule is delivered from the external terminal 200 to the vehicle 1 as at steps S113, S123, and S127 shown in FIGS. 10 and 11, recommended action information that corresponds to the vehicle state shown by this definition rule is also delivered from the external terminal 200 to the vehicle 1. Without being limited to this, only the definition rule may be delivered from the external terminal 200 to the vehicle 1 at steps S113, S123, and S127 shown in FIGS. 10 and 11. According to this, when the delivered definition rule is received, the recommended information selecting section 180 of the vehicle 1 selects recommended action information that corresponds to the vehicle state shown by the definition rule from the recommended action database 190. Thereafter, the recommended information selecting section 180 outputs the selected recommended action information to the support-system controller 50. The amount of communication between the vehicle 1 and the external terminal 200 is made even smaller by delivering only the definition rule from the external terminal 200 to the vehicle 1 in this way.

When it is determined that an upper approximation set that corresponds to condition attributes of vehicle data is absent, and that a plurality of lower approximation sets including a part of the condition attributes of vehicle data are present as shown in FIG. 11 as step S120 and steps S125 to S128, the lower approximation sets C*20 to C*22 and the unrecorded condition attribute z are transmitted from the vehicle 1 to the external terminal 200. Without being limited to this, one of the lower approximation sets C*20 to C*22 and the condition attribute z unrecorded in the in-vehicle rule set database 150 may be transmitted from the vehicle 1 to the external terminal 200. In this case, the same processing as at steps S121 to 123 of FIG. 11 is performed in the external terminal 200 based on the condition attribute z and the single lower approximation set transmitted from the vehicle 1. According to this, the amount of communication between the vehicle 1 and the external terminal 200 is made even smaller.

A determination is made at step S103 of FIG. 9 about whether a lower approximation set that corresponds to the condition attribute of the vehicle data acquired in the vehicle 1 is present in the in-vehicle rule set database 150. Also, a determination is made at step S104 of FIG. 9 about whether an upper approximation set that corresponds to the condition attribute of the vehicle data acquired in the vehicle 1 is present in the in-vehicle rule set database 150. Without being limited to this, the processing of step S104 may be excluded, and a determination may be made only about whether a lower approximation set that corresponds to the condition attribute of the vehicle data is present in the in-vehicle rule set database 150. According to this, for example, all of the condition attributes shown by the vehicle data are transmitted from the vehicle 1 to the external terminal 200 when the lower approximation set that corresponds to the condition attribute of the vehicle data is absent in the in-vehicle rule set database 150. The processing illustrated at steps S110 to S113 of FIG. 10 is performed in the external terminal 200.

As described above, the external terminal 200 is arranged to be provided with the rule set generating section 221, in which a pattern of a new condition attribute is added to the definition rule or in which a definition rule is newly generated. Without being limited to this, the rule set generating section 221 may be arranged in, for example, the state estimation controller 100 mounted in the vehicle 1. In this configuration, for example, when it is determined at step S103 of FIG. 9 that the lower approximation set that corresponds to vehicle data is absent, a definition rule that uses this vehicle data as a condition attribute is newly generated in the vehicle 1 based on the vehicle data. Thereafter, a decision attribute that is the state of the vehicle 1 when the vehicle data is acquired is prescribed, for example, by monitoring a subsequent state of the vehicle 1 or by analyzing this vehicle data. A new definition rule is generated by correlating this prescribed decision attribute with the condition attribute, and this generated definition rule is additionally recorded in the in-vehicle rule set database 150. According to this, subsequently, a decision attribute that corresponds to the condition attribute when the vehicle data is assumed as a condition attribute, i.e., the vehicle state can be derived by the vehicle 1 alone. Assume that at step S104 of FIG. 9 it is determined that a lower approximation set that corresponds to the condition attribute of the vehicle data is present in the in-vehicle rule set database 150, and yet an upper approximation set corresponding to, for example, z that is a condition attribute of the vehicle data is absent in the in-vehicle rule set database 150. If so, in this modification, processing in which, for example, the condition attribute z is newly added to an upper approximation set of a definition rule that has a lower approximation set corresponding to a condition attribute of vehicle data recorded in the in-vehicle rule set database 150 is performed not in the external terminal 200 in the vehicle 1 alone. As a result, subsequently, it is possible to derive the decision attribute corresponding to the vehicle data by the vehicle 1 alone even if the condition attribute z is included in the acquired vehicle data as an upper approximation set. Accordingly, each time vehicle data unrecorded in the in-vehicle rule set database 150 is acquired, a definition rule is appropriately generated or a new upper approximation set is appropriately added newly, and, as a result, the rule set recorded in the in-vehicle rule set database 150 is extended. As a result, a variation in the vehicle state that can be estimated by the state estimation controller 100 is fulfilled. Additionally, in this configuration, the vehicle 1 may be allowed to collect vehicle data based on a plurality of kinds of vehicle operations acquired in another vehicle by vehicle-to-vehicle communication between the vehicle 1 and an another vehicle. Additionally, the rule set generating section mounted in the vehicle 1 may be allowed to generate a definition rule or a pattern of a condition attribute in the vehicle 1 based on vehicle data collected from another vehicle. According to this, it is possible to generate a definition rule having more patterns in the vehicle 1 based on vehicle data collected from not only the vehicle 1 but also a plurality of vehicles, and, consequently, a vehicle state that can be estimated is diversified.

When a definition rule capable of estimating a vehicle state is absent in the in-vehicle rule set database 150, the state estimation controller 100 inquires a corresponding definition rule of the external terminal 200. The external terminal 200 delivers a definition rule capable of estimating the vehicle state as a response to the inquiry to the vehicle 1. Without being limited to this, when a definition rule capable of estimating a vehicle state is absent in the in-vehicle rule set database 150, the state estimation controller 100 may inquire a vehicle state estimation result of the external terminal 200. According to this, the state estimation controller 100 transmits a condition attribute undefined in the in-vehicle rule set database 150, data showing a lower or upper approximation set, and the like to the external terminal 200. The external terminal 200 estimates the state of the vehicle 1 based on the data received from the vehicle 1, and delivers an estimated result or corresponding recommended action information to the state estimation controller 100 of the vehicle 1. As a result, the calculation load of the state estimation controller 100 is made even smaller.

A pattern of a new condition attribute is recorded (is contracted) such that a condition attribute of a new upper approximation set is added to a condition attribute of an already defined definition rule. Without being limited to this, for example, a pattern of a new condition attribute may be recorded such that a condition attribute of a new upper approximation set is added to an already-known lower approximation set, and a new definition rule is defined by these lower and upper approximation sets. In other words, although a lower approximation set recorded in the definition rule is included in vehicle data acquired from the vehicle 1 in the aforementioned embodiment, when the remaining vehicle data is absent in the upper approximation set of the definition rule, a pattern of an upper approximation set that uses the remaining vehicle data as a condition attribute is added. Instead of this, for example, it is assumed that vehicle data supplied to estimate a vehicle state is c, g, h, and x, and the lower approximation set of the definition rule 6 is shown by C*6 made up of the condition attributes c, g, and h. Additionally, it is assumed that the condition attribute x is undefined in the upper approximation set of definition rule 6. At this time, in this modification, the lower approximation set C*6 is used as a contraction, and, for example, a definition rule 6' in which the condition attribute h is correlated with the lower approximation set C*6 as an upper approximation set is newly defined. According to this, even if a definition rule is newly defined in this way, it is possible to newly define a definition rule by correlating an unknown condition attribute with data showing a lower approximation set showing a plurality of condition attributes. As a result, there is no need to newly define a definition rule by using all condition attributes that form a lower approximation set, and the amount of data showing a definition rule is reduced. Without being limited to this, a pattern of a new condition attribute or a new definition rule may be newly generated by data showing all condition attributes that form a lower approximation set and by data showing the condition attribute of a new upper approximation set.

A definition rule including a part of the condition attributes of vehicle data as an upper approximation set is selected as a definition rule used to estimate a vehicle state. Without being limited to this, a definition rule including all condition attributes of vehicle data as a lower approximation set may be selected as a definition rule used to estimate a vehicle state. A vehicle state may be estimated based on this selected definition rule.

The vehicular information terminal is formed of the state estimation controller 100 incorporated in the vehicle 1. Without being limited to this, the vehicular information terminal may be formed of, for example, an information terminal such as a smart phone or a tablet terminal. In this configuration, for example, the information terminal has a function corresponding to the vehicle data acquiring section 110, the vehicle data processing section 120, the rule set searching section 130, and the rule set management section 140 of the state estimation controller 100. Additionally, in this configuration, the information terminal has a function corresponding to the in-vehicle rule set database 150, the communicating section 160, the state estimation section 170, the recommended information selecting section 180, and the recommended action database 190. The information terminal acquires vehicle data transmitted into the vehicular network 2 by wireless communication with the vehicular network 2 arranged in the vehicle 1, wired communication through a data link connector (DLC), and the like. Thereafter, the information terminal estimates a vehicle state based on this acquired vehicle data, and provides recommended action information to the driver through an audio device or a display device of the information terminal. When a vehicle state cannot be estimated based on vehicle data, the information terminal transmits vehicle data showing a lower approximation set or an upper approximation set to the external terminal 200. According to this, advantages corresponding to the items (1) to (12) can be obtained, and the state of the vehicle 1 can be estimated at a higher degree of freedom.

A vehicle state is estimated by cooperation between the vehicular information terminal and the external terminal 200. Without being limited to this, a vehicle state may be estimated by the vehicular information terminal alone or by only the external terminal 200 alone. According to this, the vehicular information terminal or the external terminal 200 acquires vehicle data of a vehicle that is a target of estimation, and estimates a vehicle state based on this acquired vehicle data.

A vehicle state estimation result is used for driving support by the support-system controller 50. Without being limited to this, for example, a vehicle state estimation result may be used for a vehicle failure diagnosis, and the like. According to this, for example, instead of the recommended action database 190 or the recommended action database 240, a database in which the presence or absence of failure of predetermined various pieces of vehicle equipment or of various in-vehicle controllers is correlated with a vehicle state corresponding to a decision attribute is mounted on the state estimation controller 100 and the external terminal 200. The presence or absence of failure of various pieces of vehicle equipment or various in-vehicle controllers may be diagnosed each time a vehicle state is estimated. Alternatively, the presence or absence of failure of various pieces of vehicle equipment or various in-vehicle controllers may be diagnosed on the condition that the vehicle state has shifted to a state in which malfunction is expected to occur.

A vehicle state is estimated each time vehicle data is acquired. Without being limited to this, a vehicle state is not necessarily required to be estimated in real time each time vehicle data is acquired. In other words, for example, vehicle data acquired in the vehicle 1 and the like may be stored in a specific database and the like, and a past vehicle state may be estimated while using this stored vehicle data as a condition attribute. As a result, it is possible to estimate a vehicle state through simple processing when a vehicle state is estimated in an ex-post facto manner.

DESCRIPTION OF THE REFERENCE NUMERALS

1 . . . Vehicle, 2 . . . Vehicular network, 3 . . . External network, 10 . . . Information-system controller, 20 . . . Control-system controller, 30 . . . Sensor-system controller, 40 . . . Body-system controller, 50 . . . Support-system controller, 51 . . . Drive control section, 52 . . . Display control section, 53 . . . Voice control section, 60 . . . Vehicular communication apparatus, 100 . . . State estimation controller, 110 . . . Vehicle data acquiring section, 120 . . . Vehicle data processing section, 130 . . . Rule set searching section, 140 . . . Rule set management section, 150 . . . In-vehicle rule set database, 160 . . . Communicating section, 170 . . . State estimation section, 180 . . . Recommended information selecting section, 190 . . . Recommended action database, 200 . . . External terminal, 210 . . . Data receiving section, 220 . . . Integrated rule set management section, 221 . . . Rule set generating section, 230 . . . Integrated rule set database, 240 . . . Recommended action database, 250 . . . Rule transmission unit, L1 . . . Steering angle data, L2 . . . Vehicle speed data, L3 . . . Depression data, C1-C11 . . . Vehicle state.

The invention claimed is:

1. A driving support system that supports operation of a vehicle driver in accordance with a vehicle state estimated based on a plurality of portions of first vehicle data, the driving support system comprising:

a recommended action database in which recommended action information to be recommended in accordance with a vehicle state is recorded; and a driving support section that extracts recommended action information that corresponds to a vehicle state estimated by a vehicle state estimation system from the recommended action database, and the driving support section performs driving support based on the extracted recommended action information, wherein the vehicle state estimation system is configured to estimate a state of a vehicle based on the plurality of portions of first vehicle data, the vehicle state estimation system includes:

a management section that manages a rule set that is a set of definition rules defined by rough set theory, in which the portions of first vehicle data are condition attributes and the state of the vehicle is a decision attribute; and a state estimation section that acquires second vehicle data of the vehicle, which is a target of estimation, and estimates a vehicle state of the vehicle through reference to the rule set based on the acquired second vehicle data, the vehicle state estimation system is configured to estimate a vehicle state through cooperation between an on board ECU that includes the management section and the state estimation section and is used in the vehicle and a center that has a rule set group defined based on third vehicle data acquired based on a plurality of kinds of vehicle operations, the on board ECU makes an inquiry based on the second vehicle data of the vehicle that is the target of estimation to the center when a definition rule capable of estimating a vehicle state is not present or when a plurality of definition rules capable of estimating a vehicle state are present, the center selects a definition rule corresponding to the second vehicle data of the inquiry from the rule set group possessed by the center, and delivers the selected definition rule to the on board ECU, when undefined vehicle data other than condition attributes about specific decision attributes defined by the definition rules is included in the second vehicle data of the vehicle that is the target of estimation, the management section performs contraction processing that is processing to contract condition attributes corresponding to the specific decision attributes to a subset, and uses a data management unit in which undefined vehicle data has been added to the contracted condition attributes, when a condition attribute is not included in an upper approximation set of the definition rule, although the condition attribute is included in a lower approximation set defined in the definition rule in the second vehicle data acquired from the vehicle that is the target of estimation, the condition attribute of the lower approximation set is contracted, using the data management unit in which a condition attribute showing vehicle data undefined in the upper approximation set is added to the contracted lower approximation set, and the definition rule that corresponds to a pattern of a new condition attribute is defined based on the data management unit, and the driving support section includes at least one of a steering vibration controller, a traveling speed reducing controller, a vehicle behavior stabilizing controller, a display controller, and a voice controller.

2. The driving support system according to claim 1, wherein
when a condition attribute corresponding to the second vehicle data of the vehicle that is the target of estimation is not present in the rule set managed by the management section of the on board ECU, the on board ECU performs, as the inquiry, processing to transmit the second vehicle data to the center, and
the center selects, from the rule set possessed by the center, the definition rule in which the second vehicle data received from the on board ECU is defined as a condition attribute, and performs processing to deliver the selected definition rule to the on board ECU.

3. The driving support system according to claim 1, wherein, when the second vehicle data of the vehicle that is the target of estimation includes both the lower approximation set that is a basic set showing a reliability of the specific decision attribute and condition attributes not defined in the upper approximation set that are a basic set of possible condition attributes corresponding to the lower approximation set in the definition rule including the lower approximation set, the on board ECU delivers the lower approximation set about the definition rule and condition attributes undefined in the upper approximation set to the center.

4. The driving support system according to claim 3, wherein, when the definition rule that includes condition attributes included by the lower approximation set received from the on board ECU and the undefined condition attributes is present in the rule set possessed by the center, the center performs processing to transmit the definition rule to the on board ECU, and when the definition rule that includes condition attributes included by the lower approximation set received from the on board ECU and the undefined condition attributes is not present in the rule set possessed by the center, the center performs processing to newly define a rule in which the undefined condition attributes are added to the upper approximation set that is a subset included as being possible in the definition rule possessed by the center.

5. The driving support system according to claim 1, wherein, when the second vehicle data of the vehicle that is the target of estimation includes both the lower approximation set that is a basic set showing a reliability of the specific decision attribute and condition attributes undefined in the definition rule including the lower approximation set, and when a plurality of definition rules each of which includes the lower approximation set are present in the rule set managed by the management section of the on board ECU, the on board ECU delivers the plurality of lower approximation sets about the definition rules and the undefined condition attributes to the center.

6. The driving support system according to claim 5, wherein,
when a single definition rule that includes condition attributes included by any one of a plurality of lower approximation sets received from the on board ECU and the undefined condition attributes is present in the rule set possessed by the center, the center performs processing to deliver the single definition rule to the on board ECU, and
when a single definition rule that includes condition attributes included by any one of a plurality of lower approximation sets received from the on board ECU and the undefined condition attributes is not present in the rule set possessed by the center, the center performs processing to newly define a rule in which the undefined condition attributes are added to the upper approximation set that is a subset included as being possible in the definition rule possessed by the center.

7. The driving support system according to claim 1, wherein
the center manages the rule set possessed by the center independently of at least one factor among a type of the vehicle that serves as a source of vehicle data acquisition, a time of day when the third vehicle data is acquired, and a traveling environment, and
when the inquiry is received from the on board ECU, the center identifies at least one factor among the type of the vehicle in which the on board ECU is used, the time of day when the third vehicle data is acquired, and the traveling environment prior to selection of the rule set, and selects a rule set to be delivered to the on board ECU from common or similar rule sets concerning the identified factor.

8. The driving support system according to claim 1, wherein
a plurality of pieces of time-series data showing changes in a physical quantity of the vehicle are included in the first vehicle data, and
the state estimation section prescribes an evaluation item that discretely evaluates the physical quantity of the time-series data as the condition attribute, and uses a combination of evaluation items to which the plurality of pieces of time-series data for a specific period belong as the condition attribute concerning the vehicle that is the target of estimation.

9. The driving support system according to claim 1, wherein the state estimation section performs at least one of:
   a. processing to collect the first vehicle data each time a predetermined data collection period elapses and to estimate the vehicle state based on the collected first vehicle data, and
   b. processing to successively calculate a difference of a plurality of portions of the first vehicle data for consecutive specific periods and to estimate the vehicle state on the condition that the calculated difference value exceeds or falls to or below a predetermined difference threshold value.

10. A driving support method for supporting operation of a vehicle driver in accordance with a vehicle state estimated based on a plurality of portions of first vehicle data, comprising:
   recording recommended action information to be recommended in accordance with a vehicle state in a recommended action database;
   extracting recommended action information that corresponds to a vehicle state estimated by a vehicle state estimation method from the recommended action database; and
   performing driving support based on the extracted recommended action information, wherein
   the vehicle state estimation method includes estimating a state of a vehicle based on the plurality of portions of first vehicle data and comprises:
      managing, via a controller, a rule set that is a set of definition rules defined by rough set theory in which the portions of first vehicle data are used as condition attributes and the vehicle state is used as a decision attribute;
      acquiring second vehicle data of a vehicle that is a target of estimation and then estimating a vehicle state through reference to the rule set based on the acquired second vehicle data;
      causing an on board ECU used in the vehicle to perform managing the rule set and estimating the vehicle state;
      in estimating the vehicle state, estimating the vehicle state by cooperation between a center that has a rule set group defined based on third vehicle data acquired based on a plurality of kinds of vehicle operations and the on board ECU, wherein, when a definition rule capable of estimating a vehicle state is not present in the on board ECU or when a plurality of definition rules capable of estimating a vehicle state is present in the on board ECU, the on board ECU is caused to make an inquiry based on the second vehicle data of the vehicle that is the target of estimation to the center; and
      selecting a rule set corresponding to the second vehicle data of the inquiry from the rule set group possessed by the center and then delivering a selected rule set from the center to the on board ECU,
   managing the rule set further includes, when undefined vehicle data other than a condition attribute about a specific decision attribute defined in the definition rule is included in the second vehicle data of the vehicle that is the target of estimation, contracting the condition attribute that corresponds to the specific decision attribute to a subset and then using a data management unit in which undefined vehicle data has been added to a contracted condition attribute,
   when a condition attribute is not included in an upper approximation set of the definition rule, although the condition attribute is included in a lower approximation set defined in the definition rule in the second vehicle data acquired from the vehicle that is the target of estimation, contracting the condition attribute of the lower approximation set, using the data management unit in which a condition attribute showing vehicle data undefined in the upper approximation set is added to the contracted lower approximation set, and defining the definition rule that corresponds to a pattern of a new condition attribute based on the data management unit, and
   performing driving support includes providing driving support using at least one of a steering vibration controller, a traveling speed reducing controller, a vehicle behavior stabilizing controller, a display controller, and a voice controller.

11. A driving support system that supports operation of a vehicle driver in accordance with a vehicle state estimated based on a plurality of portions of first vehicle data, the driving support system comprising:
   a recommended action database in which recommended action information to be recommended in accordance with a vehicle state is recorded; and
   a driving support section that extracts recommended action information that corresponds to a vehicle state estimated by a vehicle state estimation system from the recommended action database, and the driving support section performs driving support based on the extracted recommended action information, wherein
   the vehicle state estimation system is configured to estimate a state of a vehicle based on the plurality of portions of first vehicle data, the vehicle state estimation system comprising:
      a management section that manages a rule set that is a set of definition rules defined by rough set theory, in which the portions of first vehicle data are condition attributes and the state of the vehicle is a decision attribute; and
      a state estimation section that acquires second vehicle data of the vehicle, which is a target of estimation, and estimates a vehicle state of the vehicle through reference to the rule set based on the acquired second vehicle data,
   the vehicle state estimation system is configured to estimate a vehicle state through cooperation between a portable terminal that includes the management section and the state estimation section and is used in the vehicle and a center that has a rule set group defined based on third vehicle data acquired based on a plurality of kinds of vehicle operations,
   the portable terminal makes an inquiry based on the second vehicle data of the vehicle that is the target of estimation to the center when a definition rule capable of estimating a vehicle state is not present or when a plurality of definition rules capable of estimating a vehicle state are present,
   the center selects a definition rule corresponding to the second vehicle data of the inquiry from the rule set group possessed by the center, and delivers the selected definition rule to the portable terminal,
   when undefined vehicle data other than condition attributes about specific decision attributes defined by the definition rules is included in the second vehicle data of the vehicle that is the target of estimation, the management section performs contraction processing that is processing to contract condition attributes corresponding to the specific decision attributes to a subset, and uses a data management unit in which undefined vehicle data has been added to the contracted condition attributes, when a condition attribute is not included in an upper approximation set of the definition rule, although the condition attribute is included in a lower approximation set defined in the definition rule in the second vehicle data acquired from the vehicle that is the target of estimation, the condition attribute of the lower approximation set is contracted, using the data management unit in which a condition attribute showing vehicle data undefined in the upper approximation set is added to the contracted lower approximation set, the definition rule that corresponds to a pattern of a new condition attribute is defined based on the data management unit, and the driving support section includes at least one of a steering vibration controller, a traveling speed reducing controller, a vehicle behavior stabilizing controller, a display controller, and a voice controller.

* * * * *